(12) United States Patent  
Chatterjee et al.

(10) Patent No.: US 9,734,224 B2  
(45) Date of Patent: *Aug. 15, 2017

(54) DATA SYNCHRONIZATION IN A CLOUD INFRASTRUCTURE

(71) Applicant: Oracle International Corporation, Redwood Shores, CA (US)

(72) Inventors: Ramkrishna Chatterjee, Nashua, NH (US); Ramesh Vasudevan, Los Altos, CA (US); Anjani Kalyan Prathipati, Union City, CA (US); Gopalan Arun, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/664,528

(22) Filed: Mar. 20, 2015

(65) Prior Publication Data

US 2016/0070772 A1 Mar. 10, 2016

Related U.S. Application Data

(63) Continuation of application No. 13/842,833, filed on Mar. 15, 2013, now Pat. No. 9,015,114.

(Continued)

(51) Int. Cl.
*G06F 17/30* (2006.01)
*G06Q 10/06* (2012.01)
(Continued)

(52) U.S. Cl.
CPC .. *G06F 17/30575* (2013.01); *G06F 17/30082* (2013.01); *G06F 17/30283* (2013.01);
(Continued)

(58) Field of Classification Search
CPC ......... G06F 17/30292; G06F 17/30575; G06F 17/30082; G06F 17/30174;
(Continued)

(56) References Cited

U.S. PATENT DOCUMENTS 5,892,909 A 4/1999 Grasso et al.
5,911,143 A 6/1999 Deinhart et al.
(Continued)

FOREIGN PATENT DOCUMENTS

CN 104604201 5/2015
EP 0538464 A1 4/1993
(Continued)

OTHER PUBLICATIONS

U.S. Appl. No. 13/841,243, Non-Final Office Action mailed on Jul. 15, 2015, 15 pages.
(Continued)

*Primary Examiner* — Frantz Coby
(74) *Attorney, Agent, or Firm* — Kilpatrick Townsend & Stockton LLP

(57) ABSTRACT

A synchronization infrastructure that synchronizes data stored between components in a cloud infrastructure system is described. A first component in the cloud infrastructure system may store subscription information related to a subscription order which may in turn be utilized by a second component in the cloud infrastructure system to orchestrate the provisioning of services and resources for the order placed by the customer. The synchronization architecture utilizes transactionally consistent checkpoints that describe the state of the data stored in the components to synchronize the data between these components.

20 Claims, 18 Drawing Sheets

Related U.S. Application Data

(60) Provisional application No. 61/698,413, filed on Sep. 7, 2012, provisional application No. 61/698,459, filed on Sep. 7, 2012, provisional application No. 61/785,299, filed on Mar. 14, 2013.

(51) Int. Cl.
| | | |
|---|---|---|
| *G06Q 30/06* | (2012.01) | |
| *H04L 12/24* | (2006.01) | |
| *H04L 12/26* | (2006.01) | |
| *H04L 12/911* | (2013.01) | |
| *H04L 29/06* | (2006.01) | |

(52) U.S. Cl.
CPC ... *G06F 17/30339* (2013.01); *G06Q 10/0633* (2013.01); *G06Q 10/06315* (2013.01); *G06Q 30/0633* (2013.01); *G06Q 30/0635* (2013.01); *H04L 41/00* (2013.01); *H04L 41/0686* (2013.01); *H04L 41/50* (2013.01); *H04L 41/5041* (2013.01); *H04L 41/5054* (2013.01); *H04L 41/5064* (2013.01); *H04L 43/0876* (2013.01); *H04L 47/70* (2013.01); *H04L 63/10* (2013.01); *H04L 63/20* (2013.01); *G06F 17/30174* (2013.01); *G06F 17/30348* (2013.01); *G06F 17/30371* (2013.01); *G06F 17/30578* (2013.01); *G06F 17/30592* (2013.01); *G06F 17/30595* (2013.01)

(58) Field of Classification Search
CPC ......... G06F 17/30283; G06F 17/30339; G06F 17/30595; G06F 17/30371; G06F 17/30348; G06F 17/30578
USPC ............... 707/610–613, 617, 620, 802, 639
See application file for complete search history.

(56) References Cited

U.S. PATENT DOCUMENTS

| | | | | |
|---|---|---|---|---|
| 5,961,636 | A * | 10/1999 | Brooks | G06F 9/3863 712/222 |
| 5,970,120 | A | 10/1999 | Kasrai | |
| 6,052,684 | A | 4/2000 | Du | |
| 6,075,937 | A * | 6/2000 | Scalzi | G06F 9/455 703/23 |
| 6,085,188 | A | 7/2000 | Bachmann et al. | |
| 6,122,640 | A * | 9/2000 | Pereira | G06F 17/30339 707/648 |
| 6,192,391 | B1 * | 2/2001 | Ohtani | G06F 9/52 709/201 |
| 6,236,988 | B1 | 5/2001 | Aldred | |
| 6,397,125 | B1 * | 5/2002 | Goldring | G05B 19/408 700/159 |
| 6,516,416 | B2 | 2/2003 | Gregg et al. | |
| 6,526,513 | B1 | 2/2003 | Shrader et al. | |
| 6,546,095 | B1 | 4/2003 | Iverson et al. | |
| 6,553,364 | B1 | 4/2003 | Wu | |
| 6,611,506 | B1 | 8/2003 | Huang et al. | |
| 6,633,907 | B1 | 10/2003 | Spencer et al. | |
| 6,745,209 | B2 * | 6/2004 | Holenstein | G06F 17/30578 707/615 |
| 6,895,471 | B1 * | 5/2005 | Tse | G06F 17/30008 707/999.008 |
| 6,934,727 | B2 * | 8/2005 | Berkowitz | G06F 17/30578 707/999.006 |
| 6,965,899 | B1 * | 11/2005 | Subramaniam | G06F 17/30339 |
| 6,970,889 | B2 * | 11/2005 | Flanagin | G06F 17/30575 |
| 7,031,967 | B2 | 4/2006 | Cheng et al. | |
| 7,051,039 | B1 | 5/2006 | Murthy et al. | |
| 7,130,839 | B2 | 10/2006 | Boreham et al. | |
| 7,136,867 | B1 | 11/2006 | Chatterjee et al. | |
| 7,290,288 | B2 | 10/2007 | Gregg et al. | |
| 7,321,904 | B2 * | 1/2008 | Holenstein | G06F 17/30578 |
| 7,363,332 | B2 * | 4/2008 | Berkowitz | G06F 17/30578 707/639 |
| 7,409,413 | B2 * | 8/2008 | Martinez | G06F 17/30368 707/702 |
| 7,428,503 | B1 | 9/2008 | Groff et al. | |
| 7,565,310 | B2 | 7/2009 | Gao et al. | |
| 7,610,585 | B2 * | 10/2009 | Shpeisman | G06F 9/52 707/999.008 |
| 7,664,866 | B2 | 2/2010 | Wakefield | |
| 7,783,746 | B2 * | 8/2010 | Hand | H04L 12/24 709/224 |
| 7,788,225 | B2 * | 8/2010 | Fish | G06F 11/1662 707/624 |
| 7,912,930 | B1 | 3/2011 | Farooqi et al. | |
| 7,921,299 | B1 | 4/2011 | Anantha et al. | |
| 7,953,896 | B2 | 5/2011 | Ward et al. | |
| 7,974,943 | B2 * | 7/2011 | Gilbert | G06F 17/30575 707/610 |
| 7,992,194 | B2 | 8/2011 | Damodaran et al. | |
| 8,095,629 | B2 | 1/2012 | Ward et al. | |
| 8,151,323 | B2 | 4/2012 | Harris et al. | |
| 8,156,083 | B2 * | 4/2012 | Banerjee | G06F 17/30306 707/679 |
| 8,204,794 | B1 | 6/2012 | Peng et al. | |
| 8,254,396 | B2 * | 8/2012 | Appanna | H04L 45/02 370/255 |
| 8,291,490 | B1 | 10/2012 | Ahmed et al. | |
| 8,321,921 | B1 | 11/2012 | Ahmed et al. | |
| 8,332,358 | B2 * | 12/2012 | Kaiser | G06F 17/30581 707/624 |
| 8,370,303 | B1 * | 2/2013 | Ceschim | G06F 17/30309 707/625 |
| 8,380,880 | B2 | 2/2013 | Gulley et al. | |
| 8,387,136 | B2 | 2/2013 | Lee et al. | |
| 8,387,137 | B2 | 2/2013 | Lee et al. | |
| 8,402,514 | B1 | 3/2013 | Thompson et al. | |
| 8,434,129 | B2 | 4/2013 | Kannappan et al. | |
| 8,499,005 | B2 | 7/2013 | Brooks et al. | |
| 8,515,907 | B2 * | 8/2013 | Burjoski | H04L 29/12132 707/610 |
| 8,572,027 | B2 * | 10/2013 | Parees | G06F 17/30595 707/610 |
| 8,572,602 | B1 | 10/2013 | Colton et al. | |
| 8,626,717 | B2 * | 1/2014 | Bendakovsky | G06F 11/1458 707/660 |
| 8,631,477 | B2 | 1/2014 | Chen et al. | |
| 8,631,478 | B2 | 1/2014 | Chen et al. | |
| 8,656,002 | B1 | 2/2014 | Adogla et al. | |
| 8,712,961 | B2 * | 4/2014 | Dwyer | G06F 17/3048 707/609 |
| 8,738,775 | B1 | 5/2014 | Adogla et al. | |
| 8,769,622 | B2 | 7/2014 | Chang et al. | |
| 8,769,704 | B2 | 7/2014 | Peddada et al. | |
| 8,788,457 | B2 * | 7/2014 | Parees | G06F 17/30371 707/610 |
| 8,788,663 | B1 | 7/2014 | Adogla et al. | |
| 8,789,157 | B2 | 7/2014 | Sinn | |
| 8,806,593 | B1 | 8/2014 | Raphel et al. | |
| 8,843,997 | B1 | 9/2014 | Hare | |
| 8,849,685 | B2 | 9/2014 | Oden | |
| 8,856,077 | B1 | 10/2014 | Samuelsson et al. | |
| 8,949,178 | B2 * | 2/2015 | Zhao | G06F 17/30348 707/610 |
| 8,972,725 | B2 | 3/2015 | Arun et al. | |
| 9,015,114 | B2 | 4/2015 | Chatterjee et al. | |
| 9,203,866 | B2 | 12/2015 | Chatterjee et al. | |
| 9,244,953 | B2 * | 1/2016 | Vingralek | G06F 17/30292 |
| 9,253,113 | B2 | 2/2016 | Vasudevan et al. | |
| 9,319,269 | B2 | 4/2016 | Arun et al. | |
| 9,397,884 | B2 | 7/2016 | Chatterjee et al. | |
| 2002/0007363 | A1 | 1/2002 | Vaitzblit | |
| 2002/0059210 | A1 | 5/2002 | Makus et al. | |
| 2002/0156664 | A1 | 10/2002 | Willcox et al. | |
| 2003/0046342 | A1 | 3/2003 | Felt et al. | |
| 2003/0212991 | A1 | 11/2003 | Mahajan | |
| 2003/0233465 | A1 | 12/2003 | Le et al. | |
| 2004/0022379 | A1 | 2/2004 | Klos et al. | |
| 2004/0066930 | A1 | 4/2004 | Bangor | |

(56) References Cited

U.S. PATENT DOCUMENTS

| | | |
|---|---|---|
| 2004/0177133 A1 | 9/2004 | Harrison et al. |
| 2004/0243941 A1 | 12/2004 | Fish |
| 2004/0267872 A1 | 12/2004 | Serdy, Jr. et al. |
| 2005/0071209 A1 | 3/2005 | Tatavu et al. |
| 2005/0144033 A1 | 6/2005 | Vreeke et al. |
| 2005/0198629 A1 | 9/2005 | Vishwanath |
| 2005/0273346 A1 | 12/2005 | Frost |
| 2005/0289013 A1 | 12/2005 | Goldberg |
| 2005/0289072 A1 | 12/2005 | Sabharwal |
| 2006/0059029 A1 | 3/2006 | Chalasani et al. |
| 2006/0059539 A1 | 3/2006 | Shashikumar et al. |
| 2006/0143704 A1 | 6/2006 | Rits et al. |
| 2006/0173724 A1 | 8/2006 | Trefler et al. |
| 2006/0265583 A1 | 11/2006 | Eilam et al. |
| 2006/0277595 A1 | 12/2006 | Kinser et al. |
| 2007/0005536 A1 | 1/2007 | Caswell et al. |
| 2007/0028098 A1 | 2/2007 | Baartman et al. |
| 2007/0043784 A1 | 2/2007 | Parkinson |
| 2007/0112952 A1 | 5/2007 | Sodhi et al. |
| 2007/0150480 A1 | 6/2007 | Hwang et al. |
| 2007/0169168 A1 | 7/2007 | Lim |
| 2007/0174101 A1 | 7/2007 | Li et al. |
| 2007/0203798 A1 | 8/2007 | Caballero et al. |
| 2007/0215683 A1 | 9/2007 | Koorland et al. |
| 2007/0220140 A1 | 9/2007 | Weidenschlager |
| 2007/0283147 A1 | 12/2007 | Fried et al. |
| 2008/0027825 A1 | 1/2008 | Boonie et al. |
| 2008/0059469 A1* | 3/2008 | Pruet ............... G06F 17/30581 |
| 2008/0077680 A1 | 3/2008 | Dellarole et al. |
| 2008/0080718 A1 | 4/2008 | Meijer et al. |
| 2008/0083036 A1 | 4/2008 | Ozzie et al. |
| 2008/0089520 A1 | 4/2008 | Keszler |
| 2008/0097816 A1 | 4/2008 | Freire et al. |
| 2008/0127183 A1 | 5/2008 | Emerson et al. |
| 2008/0147584 A1 | 6/2008 | Buss |
| 2008/0189250 A1 | 8/2008 | Cha et al. |
| 2008/0250074 A1 | 10/2008 | Parkinson |
| 2008/0256419 A1 | 10/2008 | Wojewoda et al. |
| 2008/0256606 A1 | 10/2008 | Koikara et al. |
| 2008/0270597 A1 | 10/2008 | Tenenti |
| 2008/0281617 A1 | 11/2008 | Conrad et al. |
| 2008/0313716 A1 | 12/2008 | Park |
| 2009/0063580 A1 | 3/2009 | Allen et al. |
| 2009/0126007 A1 | 5/2009 | Zamberlan et al. |
| 2009/0144729 A1 | 6/2009 | Guizar |
| 2009/0157457 A1 | 6/2009 | Huuhtanen et al. |
| 2009/0178102 A1 | 7/2009 | Alghathbar et al. |
| 2009/0205018 A1 | 8/2009 | Ferraiolo et al. |
| 2009/0265753 A1 | 10/2009 | Anderson et al. |
| 2009/0300604 A1 | 12/2009 | Barringer |
| 2009/0320093 A1 | 12/2009 | Glazier et al. |
| 2010/0114618 A1 | 5/2010 | Wilcock et al. |
| 2010/0125477 A1 | 5/2010 | Mousseau et al. |
| 2010/0161552 A1* | 6/2010 | Murarasu ........... G06F 17/30592 707/610 |
| 2010/0198730 A1 | 8/2010 | Ahmed et al. |
| 2010/0205152 A1 | 8/2010 | Ansari et al. |
| 2010/0211781 A1 | 8/2010 | Auradkar et al. |
| 2010/0251339 A1 | 9/2010 | McAlister |
| 2010/0280958 A1 | 11/2010 | Hasson et al. |
| 2010/0306818 A1 | 12/2010 | Li et al. |
| 2010/0318393 A1 | 12/2010 | Acker et al. |
| 2010/0332629 A1* | 12/2010 | Cotugno ............... G06F 9/5072 709/221 |
| 2011/0004679 A1 | 1/2011 | Lo |
| 2011/0029983 A1 | 2/2011 | Lu et al. |
| 2011/0072436 A1 | 3/2011 | Gilat et al. |
| 2011/0103566 A1 | 5/2011 | Sarkar et al. |
| 2011/0126207 A1 | 5/2011 | Wipfel et al. |
| 2011/0131146 A1 | 6/2011 | Skutnik |
| 2011/0131309 A1 | 6/2011 | Akiyama et al. |
| 2011/0137805 A1 | 6/2011 | Brookbanks et al. |
| 2011/0138051 A1 | 6/2011 | Dawson et al. |
| 2011/0153969 A1 | 6/2011 | Petrick |
| 2011/0211686 A1 | 9/2011 | Wall et al. |
| 2011/0218813 A1 | 9/2011 | Addala et al. |
| 2011/0218842 A1 | 9/2011 | Addala et al. |
| 2011/0218924 A1 | 9/2011 | Addala et al. |
| 2011/0218925 A1 | 9/2011 | Addala et al. |
| 2011/0219218 A1 | 9/2011 | Addala et al. |
| 2011/0225081 A1 | 9/2011 | Kittelsen et al. |
| 2011/0231280 A1 | 9/2011 | Farah |
| 2011/0238458 A1 | 9/2011 | Purcell et al. |
| 2011/0276951 A1 | 11/2011 | Jain |
| 2011/0288968 A1 | 11/2011 | King et al. |
| 2011/0307523 A1 | 12/2011 | Balani et al. |
| 2011/0313902 A1 | 12/2011 | Liu et al. |
| 2011/0314466 A1 | 12/2011 | Berg et al. |
| 2011/0320605 A1 | 12/2011 | Kramer et al. |
| 2012/0005341 A1 | 1/2012 | Seago et al. |
| 2012/0032945 A1 | 2/2012 | Dare et al. |
| 2012/0036220 A1 | 2/2012 | Dare et al. |
| 2012/0036245 A1 | 2/2012 | Dare et al. |
| 2012/0036440 A1 | 2/2012 | Dare et al. |
| 2012/0036442 A1 | 2/2012 | Dare et al. |
| 2012/0036552 A1 | 2/2012 | Dare et al. |
| 2012/0041844 A1 | 2/2012 | Shen et al. |
| 2012/0047357 A1 | 2/2012 | Bealkowski |
| 2012/0066755 A1 | 3/2012 | Peddada et al. |
| 2012/0072555 A1 | 3/2012 | DeLuca et al. |
| 2012/0089426 A1 | 4/2012 | Borucki |
| 2012/0096521 A1 | 4/2012 | Peddada |
| 2012/0102160 A1 | 4/2012 | Breh et al. |
| 2012/0110583 A1 | 5/2012 | Balko et al. |
| 2012/0131166 A1 | 5/2012 | Barbedette et al. |
| 2012/0131194 A1 | 5/2012 | Morgan |
| 2012/0136936 A1 | 5/2012 | Quintuna |
| 2012/0150693 A1 | 6/2012 | Dueck et al. |
| 2012/0159494 A1 | 6/2012 | Shafiee et al. |
| 2012/0159503 A1 | 6/2012 | Shafiee et al. |
| 2012/0221454 A1 | 8/2012 | Morgan |
| 2012/0226796 A1 | 9/2012 | Morgan |
| 2012/0226808 A1 | 9/2012 | Morgan |
| 2012/0246248 A1 | 9/2012 | Arita |
| 2012/0271949 A1 | 10/2012 | Radhakrishnan et al. |
| 2012/0284776 A1 | 11/2012 | Sundaram et al. |
| 2012/0297441 A1 | 11/2012 | Boldyrev et al. |
| 2012/0304191 A1 | 11/2012 | Morgan |
| 2012/0311153 A1 | 12/2012 | Morgan |
| 2012/0311154 A1 | 12/2012 | Morgan |
| 2012/0324092 A1 | 12/2012 | Brown et al. |
| 2013/0007195 A1 | 1/2013 | Rinard et al. |
| 2013/0007265 A1 | 1/2013 | Benedetti et al. |
| 2013/0030859 A1 | 1/2013 | Jung et al. |
| 2013/0042005 A1 | 2/2013 | Boss et al. |
| 2013/0047230 A1 | 2/2013 | Krishnan et al. |
| 2013/0086269 A1 | 4/2013 | Bairavasundaram et al. |
| 2013/0103640 A1 | 4/2013 | Rehman |
| 2013/0110943 A1 | 5/2013 | Menon et al. |
| 2013/0117157 A1 | 5/2013 | Iyoob et al. |
| 2013/0124401 A1 | 5/2013 | Del Real |
| 2013/0145300 A1 | 6/2013 | Mackay et al. |
| 2013/0152183 A1 | 6/2013 | Plewnia et al. |
| 2013/0204994 A1 | 8/2013 | Deshmukh et al. |
| 2013/0212160 A1 | 8/2013 | Lawson et al. |
| 2013/0212420 A1 | 8/2013 | Lawson et al. |
| 2013/0254882 A1 | 9/2013 | Kannappan et al. |
| 2013/0262556 A1 | 10/2013 | Xu et al. |
| 2013/0268480 A1 | 10/2013 | Dorman |
| 2013/0268491 A1 | 10/2013 | Chung et al. |
| 2013/0275509 A1 | 10/2013 | Micucci et al. |
| 2013/0283350 A1 | 10/2013 | Afek et al. |
| 2013/0290710 A1 | 10/2013 | Broder et al. |
| 2013/0298210 A1 | 11/2013 | Wright et al. |
| 2013/0298212 A1 | 11/2013 | Shah et al. |
| 2013/0332984 A1 | 12/2013 | Sastry et al. |
| 2013/0332985 A1 | 12/2013 | Sastry et al. |
| 2013/0336235 A1 | 12/2013 | Meyer et al. |
| 2014/0020054 A1 | 1/2014 | Lim |
| 2014/0059002 A1 | 2/2014 | Lockhart et al. |
| 2014/0074539 A1 | 3/2014 | Doering et al. |
| 2014/0074540 A1 | 3/2014 | Evans et al. |
| 2014/0074544 A1 | 3/2014 | Seetharam et al. |
| 2014/0074659 A1 | 3/2014 | Chatterjee et al. |

(56) References Cited

U.S. PATENT DOCUMENTS

| | | | |
|---|---|---|---|
| 2014/0074788 A1 | 3/2014 | Chatterjee et al. |
| 2014/0074793 A1 | 3/2014 | Doering et al. |
| 2014/0074999 A1 | 3/2014 | Khalsa et al. |
| 2014/0075016 A1 | 3/2014 | Chatterjee et al. |
| 2014/0075027 A1 | 3/2014 | Chatterjee et al. |
| 2014/0075031 A1 | 3/2014 | Doering et al. |
| 2014/0075032 A1 | 3/2014 | Vasudevan et al. |
| 2014/0075033 A1 | 3/2014 | Doering et al. |
| 2014/0075034 A1 | 3/2014 | Vasudevan et al. |
| 2014/0075239 A1 | 3/2014 | Prathipati et al. |
| 2014/0075499 A1 | 3/2014 | Arun et al. |
| 2014/0075501 A1 | 3/2014 | Srinivasan et al. |
| 2014/0075565 A1 | 3/2014 | Srinivasan et al. |
| 2014/0141743 A1 | 5/2014 | Shaw |
| 2014/0143083 A1 | 5/2014 | Prathipati et al. |
| 2014/0192717 A1 | 7/2014 | Liu et al. |
| 2014/0237502 A1 | 8/2014 | Kelsen et al. |
| 2014/0372533 A1 | 12/2014 | Fu et al. |
| 2015/0156218 A1 | 6/2015 | Arun et al. |
| 2015/0186408 A1* | 7/2015 | Zhao ............... G06F 17/30348 707/610 |
| 2015/0254286 A1* | 9/2015 | Dutta ............... G06F 17/30165 707/609 |
| 2015/0363724 A1 | 12/2015 | Chatterjee et al. |
| 2015/0365301 A1 | 12/2015 | Chatterjee et al. |
| 2016/0070772 A1 | 3/2016 | Chatterjee et al. |
| 2016/0105372 A1 | 4/2016 | Vasudevan et al. |

FOREIGN PATENT DOCUMENTS

| | | |
|---|---|---|
| EP | 2893685 | 7/2015 |
| JP | 2015-529367 | 10/2015 |
| WO | WO2010149222 | 12/2010 |
| WO | WO2012070993 A1 | 5/2012 |
| WO | WO2014039772 | 3/2014 |
| WO | WO2014039882 | 3/2014 |
| WO | WO2014039918 | 3/2014 |
| WO | WO2014039919 | 3/2014 |
| WO | WO2014039921 | 3/2014 |
| WO | 2015/191119 A1 | 12/2015 |

OTHER PUBLICATIONS

U.S. Appl. No. 13/906,835, Final Office Action mailed on Aug. 7, 2015, 21 pages.
U.S. Appl. No. 14/618,791, Non-Final Office Action mailed on Sep. 4, 2015, 17 pages.
U.S. Appl. No. 13/909,795, Notice of Allowance mailed on Sep. 18, 2015, 5 pages.
U.S. Appl. No. 13/841,768, Non-Final Office Action mailed on Oct. 6, 2015, 11 pages.
U.S. Appl. No. 13/841,994, Non-Final Office Action mailed on Oct. 26, 2015, 8 pages.
U.S. Appl. No. 13/842,833, Notice of Allowance mailed on Dec. 15, 2014, 11 pages.
"Basic Traversals," The Neo4J Manual, Neo Technology, Inc. (copyright 2012) 7 pages.
"LDAP Authentication Overview," Juniper Networks, Inc. (copyright 1999-2010) 4 pages.
"Using ldapsearch " Red Hat Directory Server 8.2 Administration Guide for managing Directory Server instances Edition 8.2.8, Red Hat, Inc. (copyright 2010) 3 pages.
Afgan et al. "CloudMan as a Tool Execution Framework for the Cloud ," IEEE Proceedings of the 35th International Convention on Information and Communication Technology, Electronics and Microelectronics (MIPRO 2012), pp. 437-441 (2012).
Alcaraz Calero, Jose M. et al., "Toward a Multi-Tenancy Authorization System for Cloud Services", IEEE Computer and Realibily Societies, Nov./Dec. 2010, pp. 48-55.
An Introduction to Role-Based Access Control, NIST/ITL Bulletin, Retrieved from the Internet: URL: http://csrc.nist.gov/groups/SNS/rbac/documents/design_implementation/Intro_role_based_access.htm on Oct. 22, 2013, Dec. 1995, 5 pages.
Anthony et al., "Consolidation Best Practices: Oracle Database 12c plugs you into the cloud", Oracle White Paper, Retrieved from the Internet: URL: http://www.oracle.com/us/products/database/database-private-cloud-wp-360048.pdf on Oct. 1, 2013, Jul. 2013, 30 pages.
Bastos et al. "Towards a Cloud-Based Environment for Space Systems Concept Design ," IEEE International Conference on Information Society (I-SOCIETY), pp. 478-483 (2012).
Bierman et al., "Network Configuration Protocol (NETCONF) Access Control Model", Internet Engineering Task Force, RFC 6536, Retrieved from the Internet: URL: http://tools.ietf.org/html/rfc6536 on Aug. 29, 2013, Mar. 2012, 50 pages.
Chanliau et al., "Oracle Fusion Middleware: Oracle Platform Security Services (OPSS) FAQ", Oracle, Retrieved from the Internet: URL: http://www.oracle.com/technetwork/testcontent/opss-faq-131489.pdf on Oct. 1, 2013, Jul. 2010, 6 pages.
Chiba et al., "Dynamic Authorization Extension to Remote Authentication Dial in User Service (RADIUS)", Network Working Group, RFC 5176, Retrieved from the Internet: URL: http://tools.ietf.org/html/rfc5176 on Aug. 29, 2013, Jan. 2008, 35 pages.
Clemm et al., "Web Distributed Authoring and Versioning (WebDAV) Access Control Protocol", Network Working Group, RFC 3744, Retrieved from the Internet: URL: http://www.ietf.org/rfc/rfc3744.txt on Aug. 29, 2013, May 2004, 66 pages.
Datta et al., "Oracle Fusion Middleware Developer's Guide for Oracle Identity Manager", Oracle, 11g Release 2, E27150-08, Retrieved from the Internet: URL: http://docs.oracle.com/cd/E37115_01/dev.1112/e27150/toc.htm on Oct. 1, 2013, Sep. 2013, 1102 pages.
Demarest et al., Oracle Cloud Computing, An Oracle White Paper, Oracle Corporation, Redwood Shores, CA, May 2010, 22 pages.
Emig et al, An Access Control Metamodel for Web Service-Oriented Architecture, 2007, IEEE, pp. 1-8.
Hunter "LDAP Searching—Setting the SCOPE Parameters," available at http://www.idevelopment.info/data/LDAP/LDAP_Resources/SEARCH_Setting_the_SCOPE_Parameter.shtml (copyright 1998-2013) 2 pages.
International Application No. PCT/US2013/058426, International Preliminary Report on Patentability mailed on Dec. 5, 2014, 6 pages.
International Application No. PCT/US2013/058596, International Preliminary Report on Patentability mailed on Dec. 5, 2014, 6 pages.
International Application No. PCT/US2013/058642, Invitation to restrict or pay additional fees mailed on Jul. 23, 2014, 3 pages.
International Application No. PCT/US2013/058642, Written Opinion mailed on Sep. 11, 2014, 8 pages.
International Patent Application No. PCT/US2013/058426, International Search Report and Written Opinion, mailed Nov. 8, 2013, 9 pages.
International Patent Application No. PCT/US2013/058426, Written Opinion, mailed Aug. 19, 2014, 7 pages.
International Patent Application No. PCT/US2013/058596, International Search Report and Written Opinion, mailed Nov. 22, 2013, 9 pages.
International Patent Application No. PCT/US2013/058596, Written Opinion, mailed Aug. 19, 2014, 6 pages.
International Patent Application No. PCT/US2013/058638, International Search Report and Written Opinion, mailed Jan. 8, 2014, 11 pages.
International Patent Application No. PCT/US2013/058639, International Search Report and Written Opinion, mailed Jan. 8, 2014, 10 pages.
International Patent Application No. PCT/US2013/058642, International Search Report and Written Opinion, mailed Feb. 7, 2014, 17 pages.
Jahid et al, MyABDAC: Compiling XACML Policies for Attribute-Based Database Access Control, Feb. 23, 2011, ACM, pp. 97-108.
Kagal et al, A Policy Language for a Pervasive Computing Environment, IEEE, 2003, 4th International Workshop, pp. 63-74.

(56) References Cited

OTHER PUBLICATIONS

Koved, et al, Access rights analysis for Java, ACM, Proceedings of the 1 ih acm, 2002, pp. 359-372.
Lau, Christina et al., "Best Practices for access control in multi-tenant cloud solutions using Tivoli Access Manager", IBM, DeveloperWorks, May 1, 2011, 8 pages.
Oracle—Breaking Cloud Security Barriers with Identity Management, Oracle, 2010, 37 pages.
Oracle Identity Management 11 g—An Oracle Whitepaper, Oracle, Jul. 2010, 61 pages.
Oracle Internet Directory Administrator's Guide: Introduction to LDAP and Oracle Internet Directory, Oracle, 10g Release 2, B14082-02, Retrieved from the Internet: URL: http://docs.oracle.com/cd/B14099_19/idmanage.1012/b14082/intro.htm on Oct. 1, 2013, 1999, 9 pages.
Oracle Service Contracts—User Guide—Release 12 Oracle, Jun. 2007.
Oracle Unveils Oracle Public Cloud, Oracle, Oct. 5, 2011, 2 pages.
Paul et al. "Architectures for the future networks and the next generation Internet: A survey," Computer Communications 34:2-42 (2011).
Rashee, Haroon et al., "Multi-Tenancy on Private Cloud", Enlighten, Feb. 2012, 20 pages.
Subi et al., "Oracle Fusion Middleware Application Security Guide", Oracle, 11g Release 1, E10043-09, Retrieved from the Internet: URL: http://docs.oracle.com/cd/E21764_01/core.1111/e10043/undejps.htm on Oct. 1, 2013, May 2011, 834 pages.
Teger et al., "Oracle Fusion Middleware Developer's Guide for Oracle Access Management", Oracle, 11g Release 2, E27134-06, Retrieved from the Internet: URL: http://docs.oracle.com/cd/E37115_01/dev.1112/e27134/toc.htm on Oct. 1, 2013, Jul. 2013, 372 pages.
Teger, "Oracle Fusion Middleware Developer's Guide for Oracle Entitlements Server", Oracle, 11g Release 1, E27154-01, Retrieved from the Internet: URL: http://docs.oracle.com/cd/E27559_01/dev.1112/e27154/handle_auth_calls.htm on Oct. 1, 2013, Jul. 2012, 132 pages.
The Oracle Identity Management Platform: Identity Services at Internet Scale, Oracle, Jul. 2012, 20 pages.
Tsai, Wei-Tek et al., "Role-Based Access Control Using Reference Ontology in Clouds", IEEE, 2011 Tenth International Symposium on Autonomous Decentralized Systems, 2011, pp. 121-128.
U.S. Appl. No. 13/835,307 Non-Final Office Action mailed on Feb. 18, 2015, 12 pages.
U.S. Appl. No. 13/838,113 Notice of Allowance mailed on Feb. 24, 2015, 15 pages.
U.S. Appl. No. 13/838,113, Non Final Office Action mailed on Aug. 28, 2014, 14 pages.
U.S. Appl. No. 13/838,537 Notice of Allowance mailed on Feb. 4, 2015, 21 pages.
U.S. Appl. No. 13/838,537, Non Final Office Action mailed on Sep. 11, 2014, 22 pages.
U.S. Appl. No. 13/838,813, Final Office Action mailed on Dec. 4, 2014, 24 pages.
U.S. Appl. No. 13/838,813, Non Final Office Action mailed on Aug. 14, 2014, 22 pages.
U.S. Appl. No. 13/840,943, Non Final Office Action mailed on Dec. 18, 2014, 10 pages.
U.S. Appl. No. 13/842,269, Non Final Office Action mailed on Jun. 5, 2014, 12 pages.
U.S. Appl. No. 13/842,269, Notice of Allowance mailed on Nov. 3, 2014, 8 pages.
U.S. Appl. No. 13/843,613 Non-Final Office Action mailed on Jan. 23, 2015, 17 pages.
U.S. Appl. No. 13/906,835 Non-Final Office Action mailed on Mar. 20, 2015, 12 pages.
U.S. Appl. No. 13/907,689, Non-Final Office Action mailed on Jan. 7, 2015, 11 pages.
U.S. Appl. No. 14/019,051, Non-Final Office Action mailed on Nov. 20, 2014, 5 pages.

Wainwright, Steve, "Oracle Public Cloud—An Enterprise Cloud for Bumeritssiness Critical Applications", Oracle, 2011, 39 pages.
XACML v3.0 Hierarchical Resource Profile Version 1.0, Oasis, Working Draft 7, Retrieved from the Internet: URL: http://xml.coverpages.org/XACML-v30-HierarchicalResourceProfile-WD7.pdf on Aug. 29, 2013, Apr. 1, 2009, 22 pages.
Oracle White Papers, Delivering Database as a Service (DBaaS) using Oracle Enterprise Manager 12c, Available online at:URL:http://www.oracle.com/technetwork/oem /cloud-mgmt/dbaasoverview-wp-1915651.pdf, Oct. 2013, 21 pages.
International Application No. PCT/US2015/016214, Written Opinion mailed on Jun. 3, 2016, 5 pages.
U.S. Appl. No. 13/841,768, Final Office Action mailed on Jun. 17, 2016, 13 pages.
U.S. Appl. No. 13/841,994, Final Office Action mailed on May 19, 2016, 10 pages.
U.S. Appl. No. 13/907,652, Final Office Action mailed on Dec. 17, 2015, 10 pages.
U.S. Appl. No. 14/618,791, Notice of Allowance mailed on Dec. 21, 2015, 7 pages.
U.S. Appl. No. 14/618,791, Supplemental Notice of Allowability mailed on Jan. 6, 2016, 2 pages.
EP Patent Application No. 13766777.0, Office Action mailed Feb. 10, 2016, 5 pages.
U.S. Appl. No. 13/907,652, Non-Final Office Action mailed Feb. 19, 2016, 11 pages.
U.S. Appl. No. 13/843,613, Non-Final Office Action mailed Mar. 21, 2016, 12 pages.
U.S. Appl. No. 13/841,243, Notice of Allowance mailed on Mar. 22, 2016, 8 pages.
U.S. Appl. No. 13/906,835, Non-Final Office Action mailed Apr. 13, 2016, 14 pages.
"World of Warcraft: Catacylsm Can Run When It Is Partially", downloaded from URL:https://zhidao.baidu.com/question/315386072.html, 1 page.
U.S. Appl. No. 14/624,356 , Final Office Action mailed on Mar. 13, 2017, 13 pages.
U.S. Appl. No. 13/907,652 , Notice of Allowance mailed on Jan. 25, 2017, 7 pages.
China Patent Application No. CN201380046472.4 , Office Action mailed on Feb. 20, 2017, 25 pages.
U.S. Appl. No. 13/838,813, Non-Final Office Action mailed on Mar. 12, 2015, 21 pages.
U.S. Appl. No. 14/019,051, Notice of Allowance mailed on Feb. 27, 2015, 7 pages.
U.S. Appl. No. 13/843,613, Final Office Action mailed on Jun. 2, 2015, 20 pages.
U.S. Appl. No. 13/907,652, Non-Final Office Action mailed on Jun. 3, 2015, 10 pages.
U.S. Appl. No. 13/909,795, Non-Final Office Action mailed on Apr. 23, 2015, 9 pages.
Notice of Allowance mailed Jun. 29, 2015 in U.S. Appl. No. 13/840,943, 10 pages.
International Application No. PCT/US2013/058642, International Preliminary Report on Patentability mailed on Jan. 20, 2015, 10 pages.
International Application No. PCT/US2013/058639, Written Opinion mailed on Jul. 7, 2015, 6 pages.
International Application No. PCT/US2015/016214 International Search Report and Written Opinion mailed on May 11, 2015, 11 pages.
U.S. Appl. No. 13/907,652, Final Office Action mailed on Sep. 13, 2016, 14 pages.
U.S. Appl. No. 14/624,356, Non-Final Office Action mailed on Sep. 15, 2016, 9 pages.
U.S. Appl. No. 13/841,994, Notice of Allowance mailed on Dec. 5, 2016, 5 pages.
International Application No. PCT/US2015/016214, International Preliminary Report on Patentability mailed on Sep. 19, 2016, 6 pages.

* cited by examiner

CHECKPOINTS TABLE — 808

| Table Name | Checkpoint number | Run time | Run number |
|---|---|---|---|
| Source Data Table-1 | 8900000 | 11-Feb-2013 4:00:00 EST | 2 |
| Source Data Table-2 | 8769000 | 11-Feb-2013 4:01:00 EST | 3 |

SOURCE COMPONENT MAPPING TABLE — 818

| Source component table name | Target component interface table name |
|---|---|
| Source Data Table-1 | Target Interface Table-1 |
| Source Data Table-2 | Target Interface Table-2 |

TARGET COMPONENT MAPPING TABLE — 819

| Target component interface table name | Target component table name |
|---|---|
| Target Interface Table-1 | Target Data Table-1 |
| Target Interface Table-2 | Target Data Table-2 |

SOURCE DATA TABLE-1 — 810

| Row number | Checkpoint number | Last modification time | Order status |
|---|---|---|---|
| 1 | 8900000 | 11-Feb-2013 4:00:00 EST | INITIALIZED |
| 2 | 7000000 | 09-Feb-2013 4:50:00 EST | COMPLETED |
| 3 | 8900001 | 11-Feb-2013 4:03:00 EST | ACTIVE |
| 4 | 8900007 | 11-Feb-2013 4:07:00 EST | READY TO BE PROVISIONED |
| 5 | 8900009 | 11-Feb-2013 5:01:00 EST | COMPLETED |

TARGET INTERFACE TABLE-1 — 822

| Row number | Run number | Run time | Order status |
|---|---|---|---|
| 1 | 2 | 11-Feb-2013 4:00:00 EST | INITIALIZED |
| 2 | 1 | 09-Feb-2013 4:50:00 EST | COMPLETED |

RUNS TABLE — 832

| Table Name | Run time | Run number |
|---|---|---|
| Target Interface Table-1 | 11-Feb-2013 4:00:00 EST | 2 |
| Target Interface Table-2 | 11-Feb-2013 4:01:00 EST | 3 |

FIG. 8B

| Row number | Run number | Run time | Order status |
|---|---|---|---|
| 1 | 2 | 11-Feb-2013 4:00:00 EST | INITIALIZED |
| 2 | ... | 09-Feb-2013 4:50:00 EST | COMPLETED |
| 3 | 3 | 11-Feb-2013 4:03:00 EST | ACTIVE |
| 4 | 3 | 11-Feb-2013 4:07:00 EST | READY TO BE PROVISIONED |
| 5 | 3 | 11-Feb-2013 5:01:00 EST | COMPLETED |

UPDATED TARGET INTERFACE DATA TABLE -1 (838)

| Table Name | Checkpoint number | Run time | Run number |
|---|---|---|---|
| Source Data Table-1 | 8900009 | 11-Feb-2013 5:01:00 EST | 3 |
| Source Data Table-2 | 8769000 | 11-Feb-2013 4:01:00 EST | 3 |

UPDATED CHECKPOINTS TABLE (836)

| Table Name | Run time | Run number |
|---|---|---|
| Target Data Table-1 | 11-Feb-2013 5:01:00 EST | 3 |
| Target Data Table-2 | 11-Feb-2013 4:01:00 EST | 3 |

UPDATED RUNS TABLE (840)

FIG. 8C

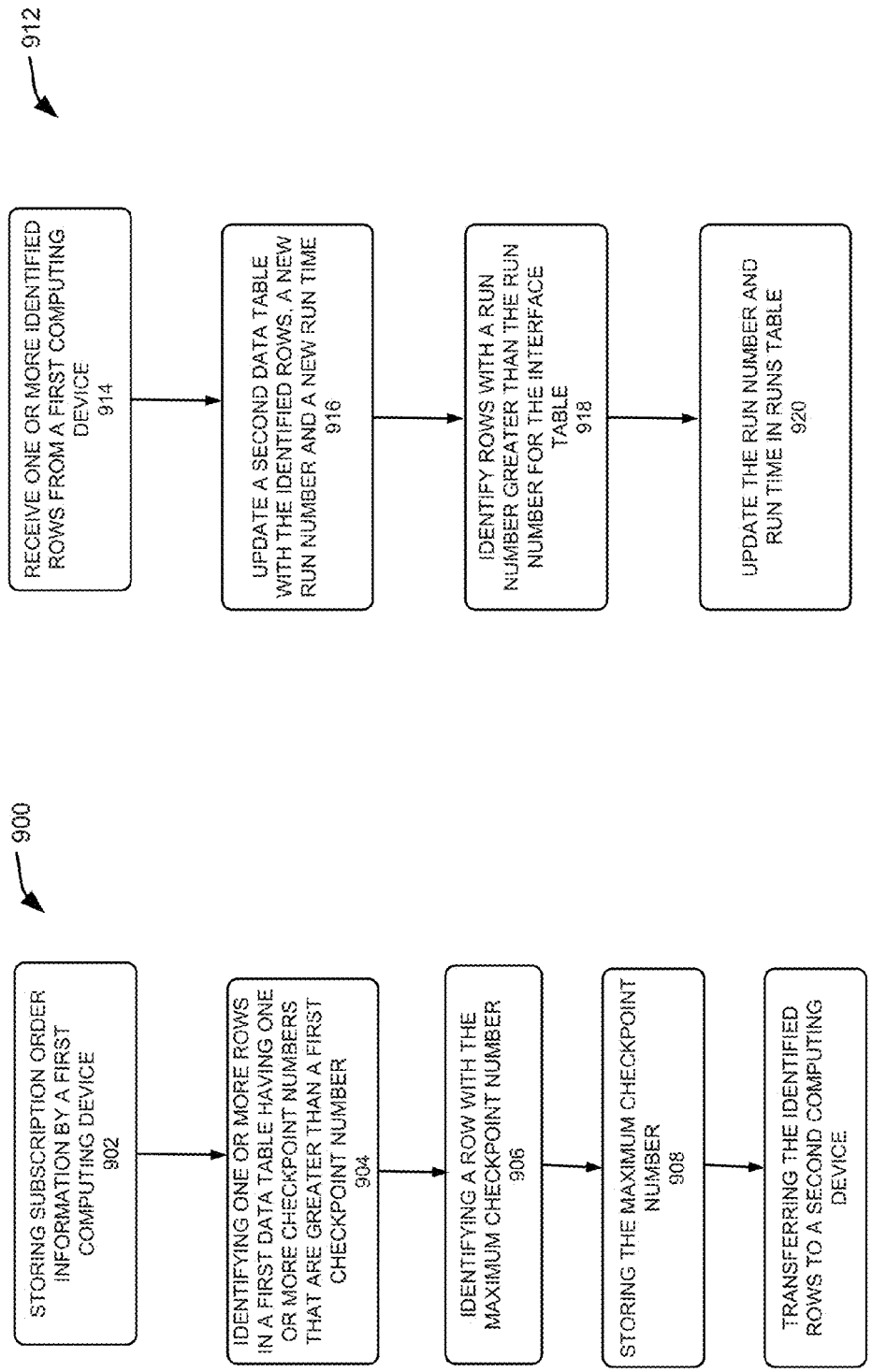

DATA SYNCHRONIZATION IN A CLOUD INFRASTRUCTURE

CROSS-REFERENCES TO RELATED APPLICATIONS

This application is a continuation of U.S. patent application Ser. No. 13/842,833, filed on Mar. 15, 2013, now U.S. Patent Application Publication No. US-2014-0074788A1, now allowed, the entire contents of which is hereby incorporated by reference in its entirety for all purposes.

BACKGROUND OF THE INVENTION

The present disclosure relates to computer systems and software, and more particularly to techniques for facilitating and automating the provision of services in a cloud environment.

Cloud computing is a model for enabling convenient, on-demand network access to a shared pool of configurable computing resources (e.g., networks, servers, storage, applications, and services). The services provided or accessed through the cloud (or network) are referred to as cloud services. There is a lot of processing that needs to be performed by a cloud service provider to make cloud services available to a subscribing customer. Due to its complexity, much of this processing is still done manually. For example, provisioning resources for providing such cloud services can be a very labor intensive process.

BRIEF SUMMARY OF THE INVENTION

Certain embodiments of the present invention provide techniques for automating the provisioning, managing and tracking of services provided by a cloud infrastructure system. In one embodiment, the cloud infrastructure system stores subscription order information related to one or more services subscribed to by a customer in the cloud infrastructure system.

In certain embodiments, cloud infrastructure system defines a synchronization infrastructure that synchronizes data stored between the components in the cloud infrastructure system to ensure consistency of information stored by these components. The data generated by a component in the cloud infrastructure system is usually cached and consumed by another component in the cloud infrastructure system. For example, a first component in the cloud infrastructure system may store subscription information related to a subscription order which may in turn be utilized by a second component in the cloud infrastructure system to orchestrate the provisioning of services and resources for the order placed by the customer. The synchronization architecture utilizes transactionally consistent checkpoints that describe the state of the data stored in the components to synchronize the data between the components.

Some embodiments relate to a method for synchronizing data between components in a cloud infrastructure system. The method includes identifying one or more rows in a first data table having one or more checkpoint numbers that are greater than a first checkpoint number by a first computing device in the cloud infrastructure system and identifying, from the identified rows, a row with the maximum checkpoint number. The method then includes storing, the maximum checkpoint number. Then, the method includes transferring the identified rows to a second computing device in the cloud infrastructure system, wherein information in the identified rows is utilized by the second computing device to process the subscription order for the customer in the cloud infrastructure system.

BRIEF DESCRIPTION OF THE DRAWINGS

Illustrative embodiments of the present invention are described in detail below with reference to the following drawing figures:

FIG. 8B illustrates exemplary information stored in the various tables in the source component and the target component to achieve data synchronization, according to one embodiment of the present invention.

FIG. 8C illustrates updated tables in the source component and the target component as a result of data synchronization.

FIG. 9A depicts a simplified flowchart depicting processing that may be performed by the source component to achieve data synchronization, in accordance with an embodiment of the present invention.

FIG. 9B depicts a simplified flowchart depicting processing that may be performed by the target component to achieve data synchronization, in accordance with an embodiment of the present invention.

DETAILED DESCRIPTION OF THE INVENTION

Figure 1A:
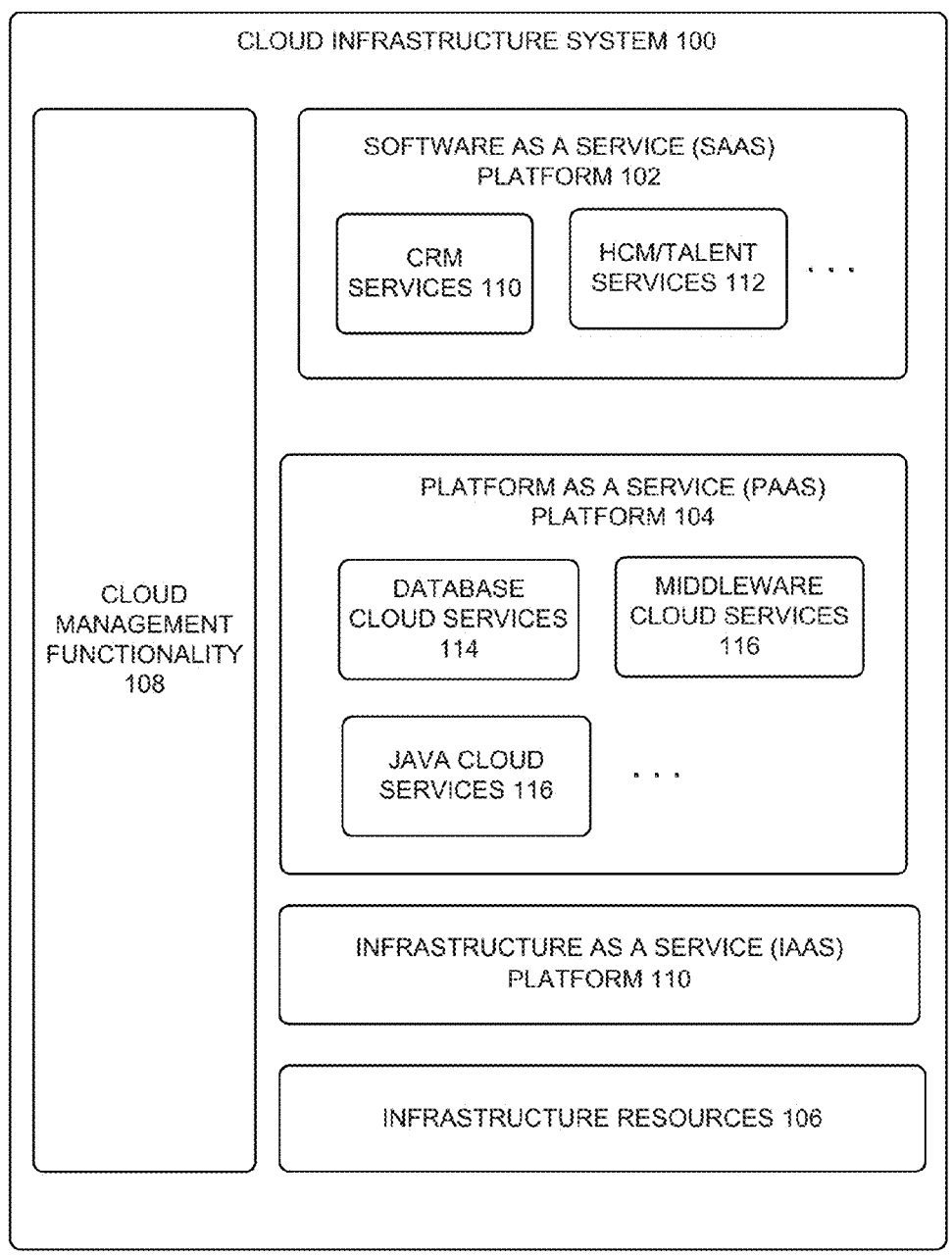
FIG. 1A is a logical view of a cloud infrastructure system according to one embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments of the present invention provide techniques for automating the provisioning, managing and tracking of services provided by a cloud infrastructure system.

In certain embodiments, a cloud infrastructure system may include a suite of applications, middleware and database service offerings that are delivered to a customer in a self-service, subscription-based, elastically scalable, reliable, highly available, and secure manner. An example of such a cloud infrastructure system is the Oracle Public Cloud provided by the present assignee.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud infrastructure system according to one embodiment of the present invention. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 110 (e.g., Fusion CRM services provided by the Oracle cloud), Human Capital Management (HCM)/Talent Management services 112, and the like. CRM services 110 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present invention. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computing resources such as storage, networks, and other fundamental computing resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

Figure 1B:
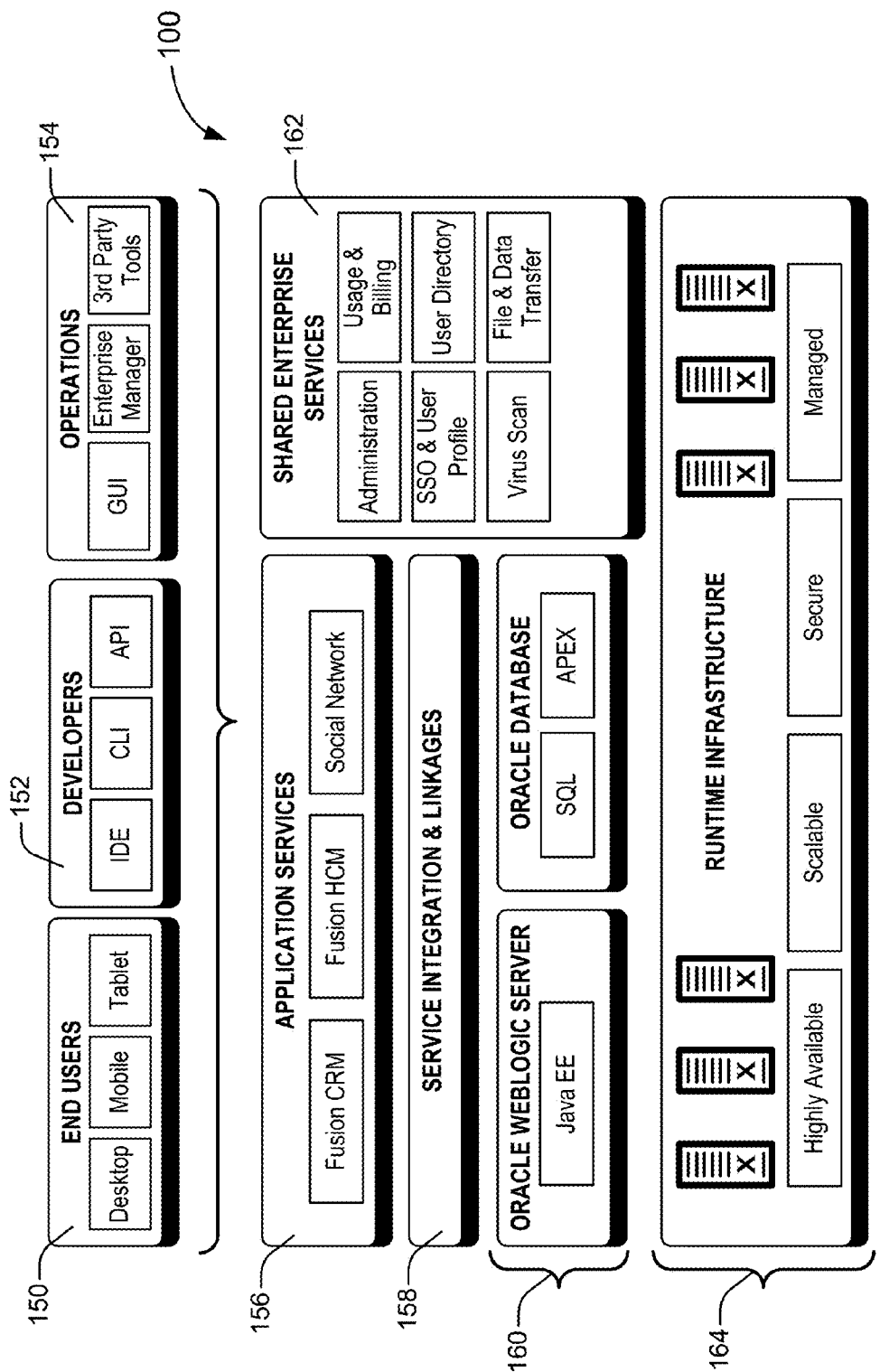
FIG. 1B is a simplified block diagram of a hardware/software stack that may be used to implement a cloud infrastructure system according to an embodiment of the present invention.

FIG. 1B is a simplified block diagram of a hardware/software stack that may be used to implement cloud infrastructure system 100 according to an embodiment of the present invention. It should be appreciated that implementation depicted in FIG. 1B may have other components than those depicted in FIG. 1B. Further, the embodiment shown in FIG. 1B is only one example of a cloud infrastructure system that may incorporate an embodiment of the invention. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

Figure 2:
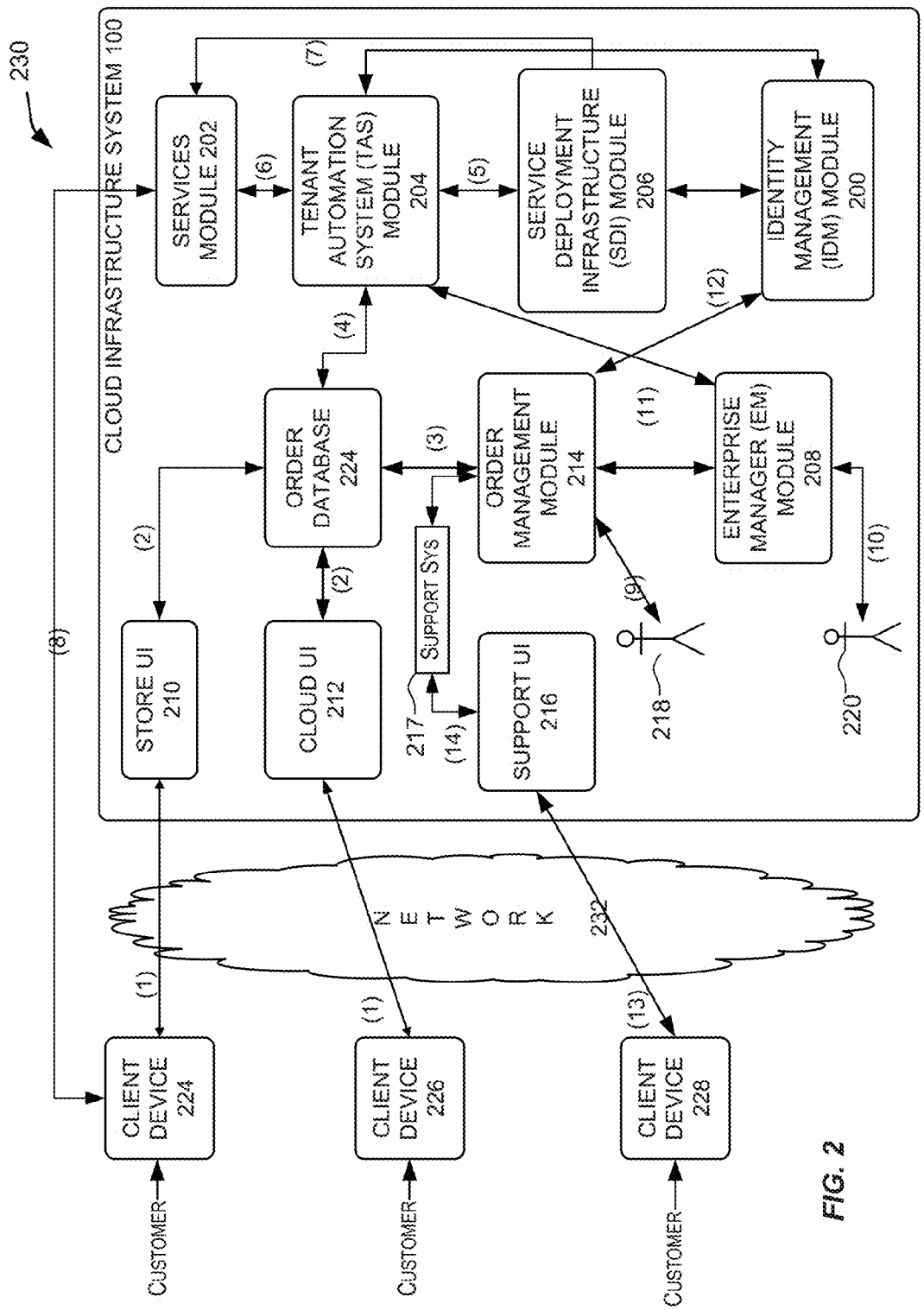
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present invention. In the illustrated embodiment, system environment 230 includes one or more client computing devices 224, 226 and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components.

Client computing devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, client computing devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computing devices, any number of client computing devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 224. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present invention. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 that the customer intends to subscribe to. A single order may include orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computing resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 224, which can be one of several databases operated by cloud infrastructure system 100 and utilized in conjunction with other system elements. While order database 224 is shown logically as a single database in FIG. 2, in actual implementation, this may comprise one or more databases.

At (3), the order is forwarded to order management module 214. Order management module 214 is configured to perform billing and accounting functions related to the order such as verifying the order and upon verification, booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS module 204. In one embodiment, TAS module 204 utilizes the order information to orchestrate the provisioning of services and resources for the order placed by the customer. At (5), TAS component 204 orchestrates the provisioning of resources to support the subscribed services using the services of SDI module 206. At (6) TAS module 204 provides information related to the provisioned order received from SDI module 206 to services module 202. In some embodiments, at (7), SDI module 206 may also use services provided by services module 202 to allocate and configure the resources needed to fulfill the customer's subscription order.

At (8), services module 202 sends a notification to the customers on client devices 224, 226 and 228 regarding the status of the order.

In certain embodiments, TAS module 204 functions as an orchestration component that manages business processes associated with each order and applies business logic to determine whether an order should proceed to provisioning. In one embodiment, upon receiving an order for a new subscription, TAS module 204 sends a request to SDI module 206 to allocate resources and configure those resources needed to fulfill the subscription order. SDI module 206 enables the allocation of resources for the services ordered by the customer. SDI module 206 provides a level of abstraction between the cloud services provided by cloud infrastructure system 100 and the physical implementation layer that is used to provision the resources for providing the requested services. TAS module 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related functions such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
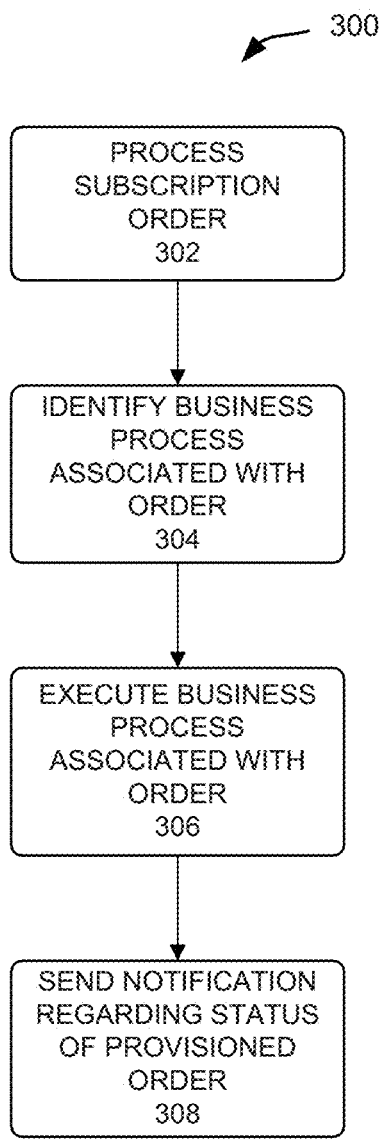
FIG. 3A depicts a simplified flowchart 300 depicting processing that may be performed by the TAS module in the cloud infrastructure system, in accordance with an embodiment of the present invention.

FIG. 3A depicts a simplified flowchart 300 depicting processing that may be performed by the TAS module in the cloud infrastructure system, in accordance with an embodiment of the present invention. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS component 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office functions such as creating a customer record for the user, performing accounting functions related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI module 206 to allocate resources and configure those resources needed to fulfill the subscription order.

At 308, a notification is sent to the customer regarding the status of the provisioned order. Additional description related to performing steps 302, 304, 306 and 308 is provided in detail in FIG. 3B.

Figure 3B:
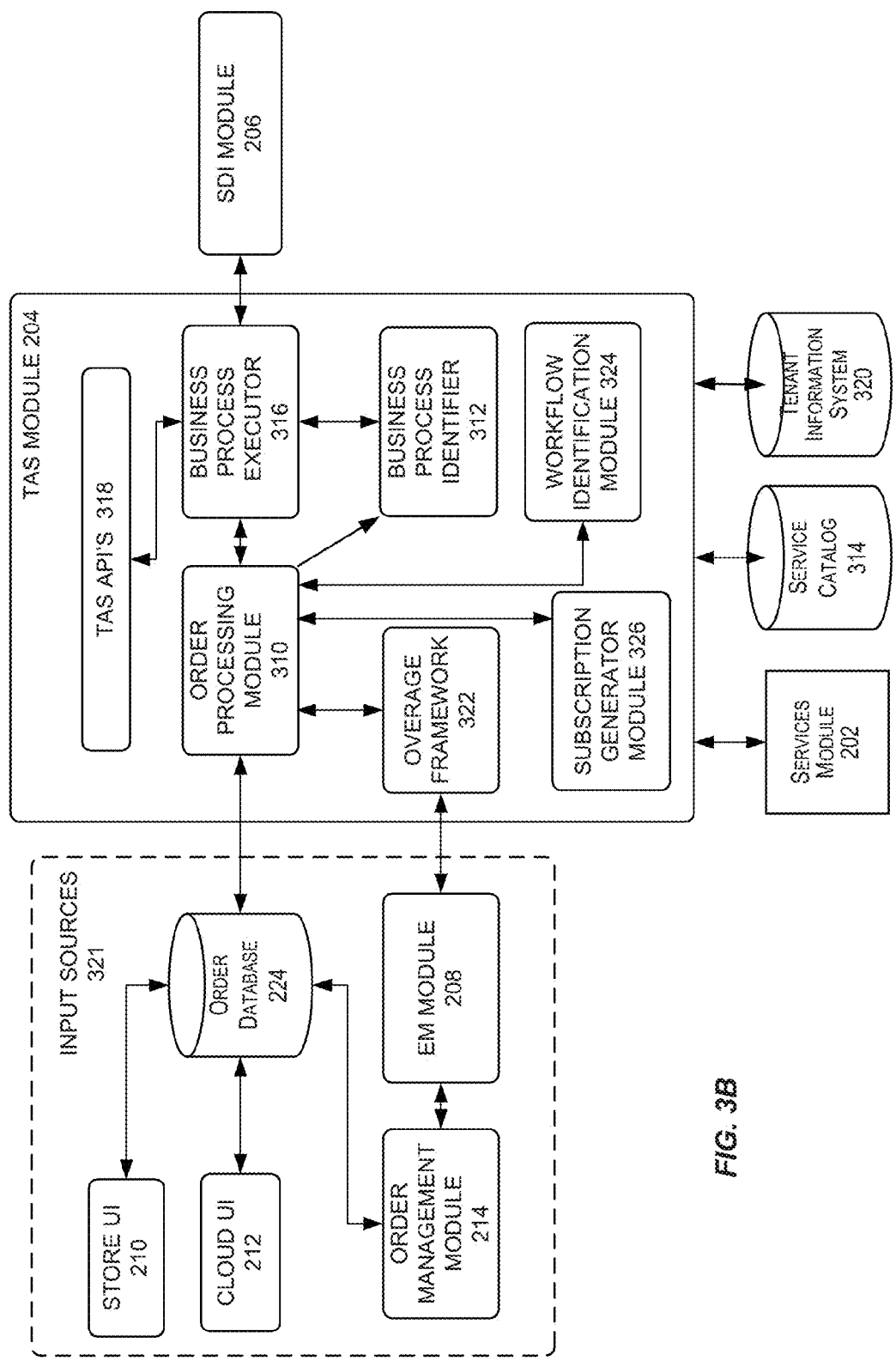
FIG. 3B depicts a simplified high level diagram of one or more sub-modules in the TAS module in the cloud infrastructure system, in accordance with an embodiment of the present invention.

FIG. 3B depicts a simplified high level diagram of one or more sub-modules in the TAS module in the cloud infrastructure system, in accordance with an embodiment of the present invention. In one embodiment, the modules depicted in FIG. 3B perform the processing described in steps 302-308 discussed in FIG. 3A. In the illustrated embodiment, TAS module 204 comprises an order processing module 310, a business process identifier 312, a business process executor 316, an overage framework 322, a workflow identification module 324, and a bundled subscription generator module 326. These modules may be implemented in hardware, or software, or combinations thereof. The various modules of the TAS module depicted in FIG. 3B are meant for illustrative purposes only and are not intended to limit the scope of embodiments of the present invention. Alternative embodiments may include more or fewer modules than those shown in FIG. 3B.

In one embodiment, order processing module 310 receives an order from a customer from one or more input sources 321. For example, order processing module 310 may directly receive an order via cloud UI 212 or store UI 210, in one embodiment. Alternatively, order processing module 310 may receive an order from order management module 214 or order database 224. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS module 204 and a notification to that effect has been delivered to the customer. An order is in an administration required state when intervention by an administrator is needed to resolve the issue. The order is in an error state when the order cannot be processed. In addition to maintaining the order progress status, order processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order or identifies service components related to the order.

In one example, business process executor 316 interacts with SDI module 206 to execute steps in a business process for allocating and provisioning resources for services requested in the subscription order. In this example, for each step in the business process, business process executor 316 may send a request to SDI component 206 to allocate resources and configure resources needed to fulfill the particular step. SDI component 206 is responsible for the actual allocation of the resources. Once all the steps of the business processes of an order have been executed, business process executor 316 may send a notification to the customer of the processed order by utilizing the services of services component 202. The notification may include sending an email notification to the customer with details of the processed order. The email notification may also include deployment information related to the order to enable the customer to access the subscribed services.

In certain embodiments, TAS module 204 may provide one or more TAS Application Programming Interfaces (APIs) 318 that enable TAS module 204 to interact with other modules in cloud infrastructure system 100 and for other modules to interact with TAS module 204. For example, the TAS APIs may include a system provisioning API that interacts with SDI module 206 via an asynchronous Simple Object Access Protocol (SOAP) based web services call to provision resources for the customer's subscription order. In one embodiment, TAS module 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS module 204 also periodically propagates subscription information, outages, and notifications (e.g. planned downtime) to services component 202.

In certain embodiments, TAS module 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS module 204 includes an order workflow identification module 324 that is configured to identify one or more workflows associated with processing a customer's subscription order. In certain embodiments, TAS module 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS module 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS module 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 100, while the data center components provide capabilities for provisioning and operating the runtime system that provides the resources for the subscribed services.

Figure 4:
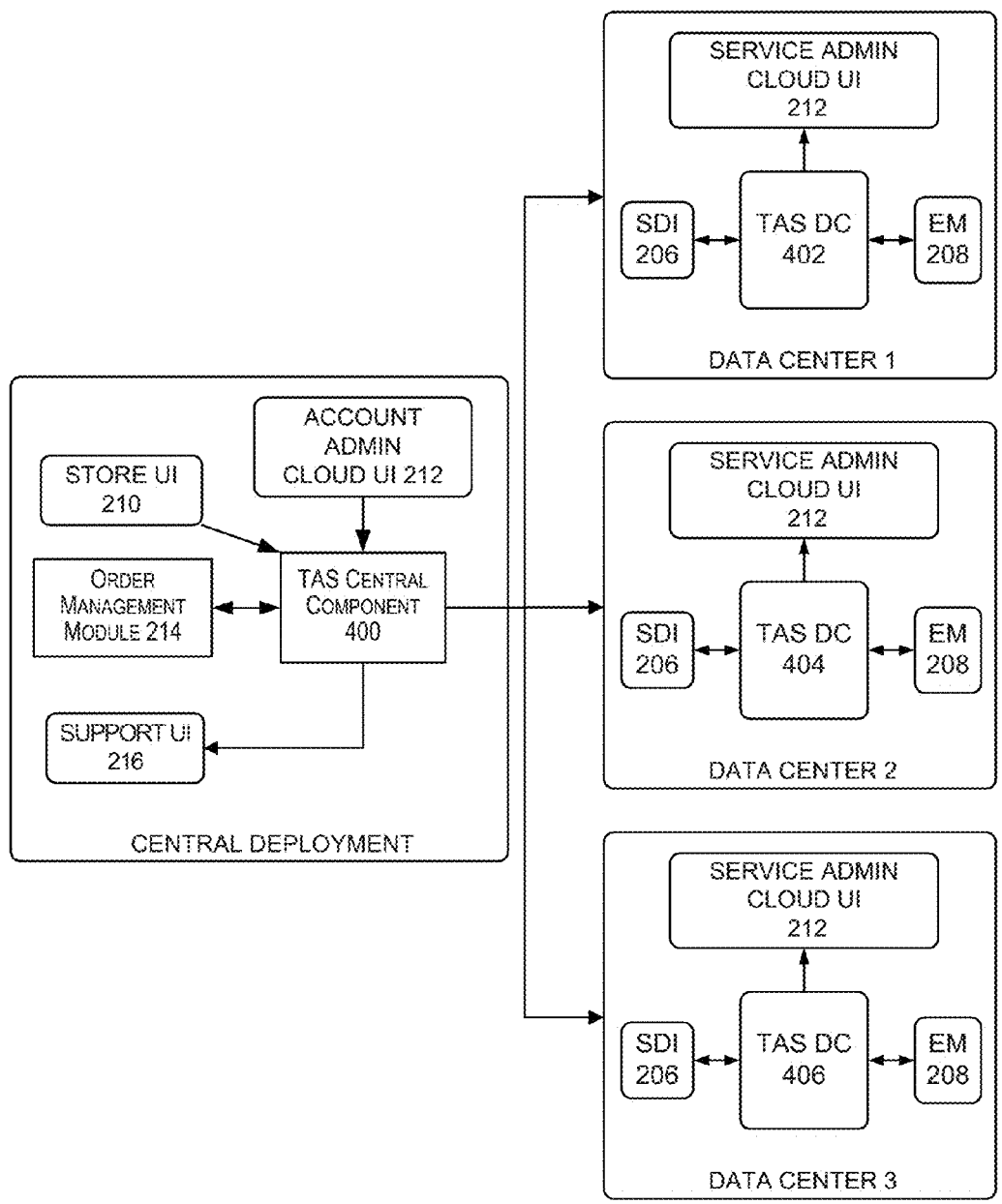
FIG. 4 depicts an exemplary distributed deployment of the TAS component, according to an embodiment of the present invention.

FIG. 4 depicts an exemplary distributed deployment of the TAS module, according to an embodiment of the present invention. In the embodiment depicted in FIG. 4, the distributed deployment of TAS module 204 includes a TAS central component 400 and one or more TAS Data Centers (DCs) components 402, 404 and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212 and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management system 214, or via order database 224. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI module 204 to orchestrate the provisioning of physical resources for the order. SDI component 204 in respective TAS DCs 402, 404 or 406 allocates resources and configures those resources needed to fulfill the subscription order.

In certain embodiments, TAS DCs, 402, 404 or 406 identify an identity domain associated with the subscription. SDI component 206 may provide the identity domain information to IDM component 200 (shown in FIG. 2) for identifying an existing identity domain or creating a new identity domain. Once the order is provisioned by the SDI module at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management system 214.

Figure 5:
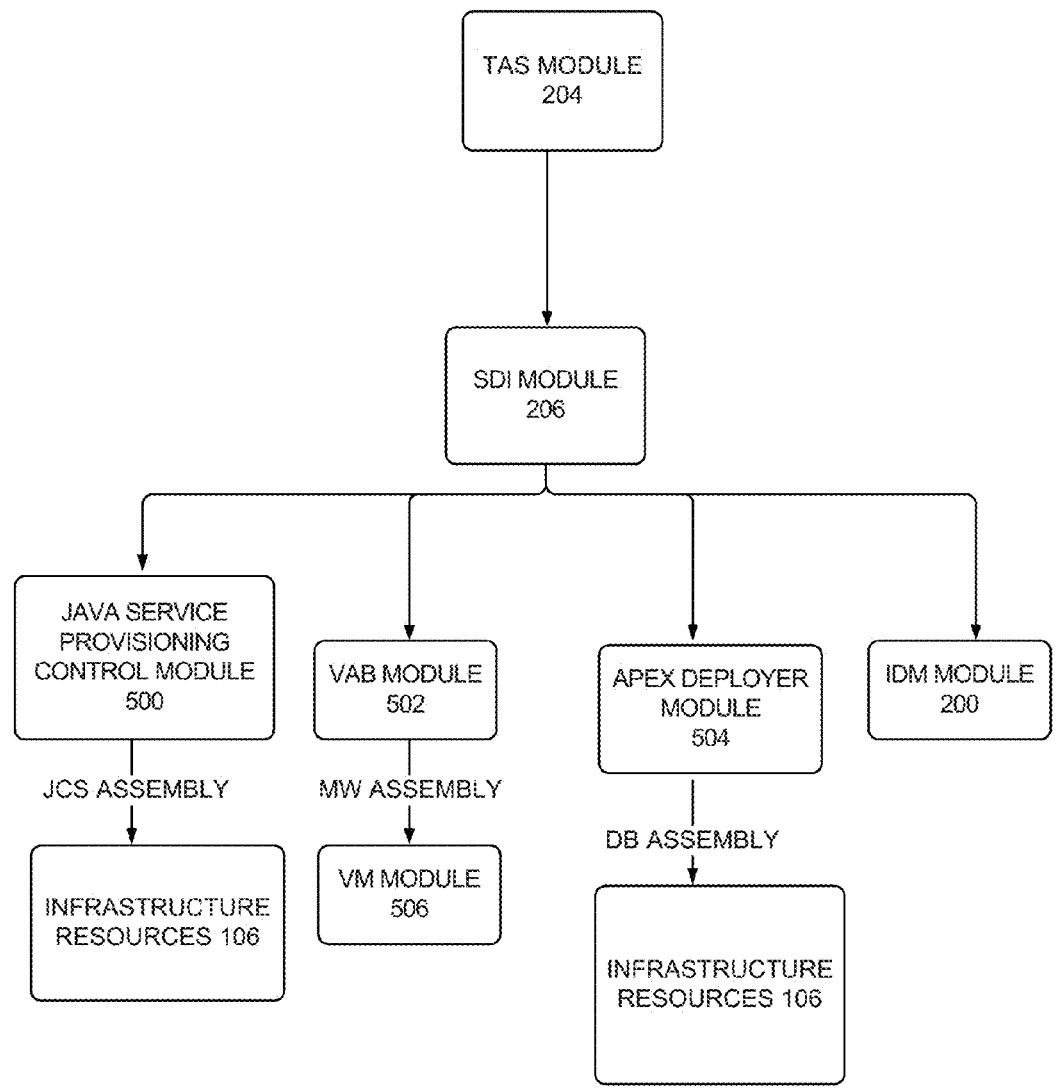
FIG. 5 is a simplified block diagram illustrating the interactions of the SDI module with one or more modules in the cloud infrastructure system, in accordance with an embodiment of the present invention.

FIG. 5 is a simplified block diagram illustrating the interactions of the SDI module with one or more modules in the cloud infrastructure system, in accordance with an embodiment of the present invention. In one embodiment, SDI module 206 interacts with TAS module 204 to provision resources for services in a subscription order received by TAS module 204. In certain embodiments, one or more of the modules illustrated in FIG. 5 may be modules within cloud infrastructure system 100. In other embodiments, one or more of the modules that interact with SDI module 206 may be outside cloud infrastructure system 100. In addition, alternative embodiments may have more or less modules than those shown in FIG. 5. These modules may be implemented in hardware, or software, or combinations thereof.

In one embodiment, the modules in SDI module 206 may include one or more modules in SaaS platform 102 and PaaS platform 104 in cloud infrastructure system 100. In order to perform provisioning of resources for various services, SDI module 206 may interact with various other modules, each customized to help with provisioning resources for a particular type of service. For example, as illustrated in FIG. 5, SDI module 206 may interact with a Java service provisioning control module 500 to provision Java cloud services. In one embodiment, Java service provisioning control component 500 may deploy a Java Cloud Service (JCS) assembly specified by SDI module 206 that includes a set of tasks to be performed to provision Java cloud services. Infrastructure resources 106 then determines the resources needed to provision the Java cloud services.

As other examples, SDI module 206 may interact with one or more modules such as a Virtual Assembly Builder (VAB) module 502, an Application Express (APEX) deployer module 504, a Virtual Machine (VM) module 506, an IDM module 200, and a database machine module 118. VAB module 502 includes capabilities to configure and provision complete multi-tier application environments. In one embodiment, VAB module 502 deploys a Middleware (MW) service assembly specified by SDI module 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI module 206 to provision a database service in cloud infrastructure system 100 using the resources provided by infrastructure resources 106. SDI module 206 interacts with IDM module 200 to provide identity services such as access management across multiple applications in cloud infrastructure system 100.

Figure 6:
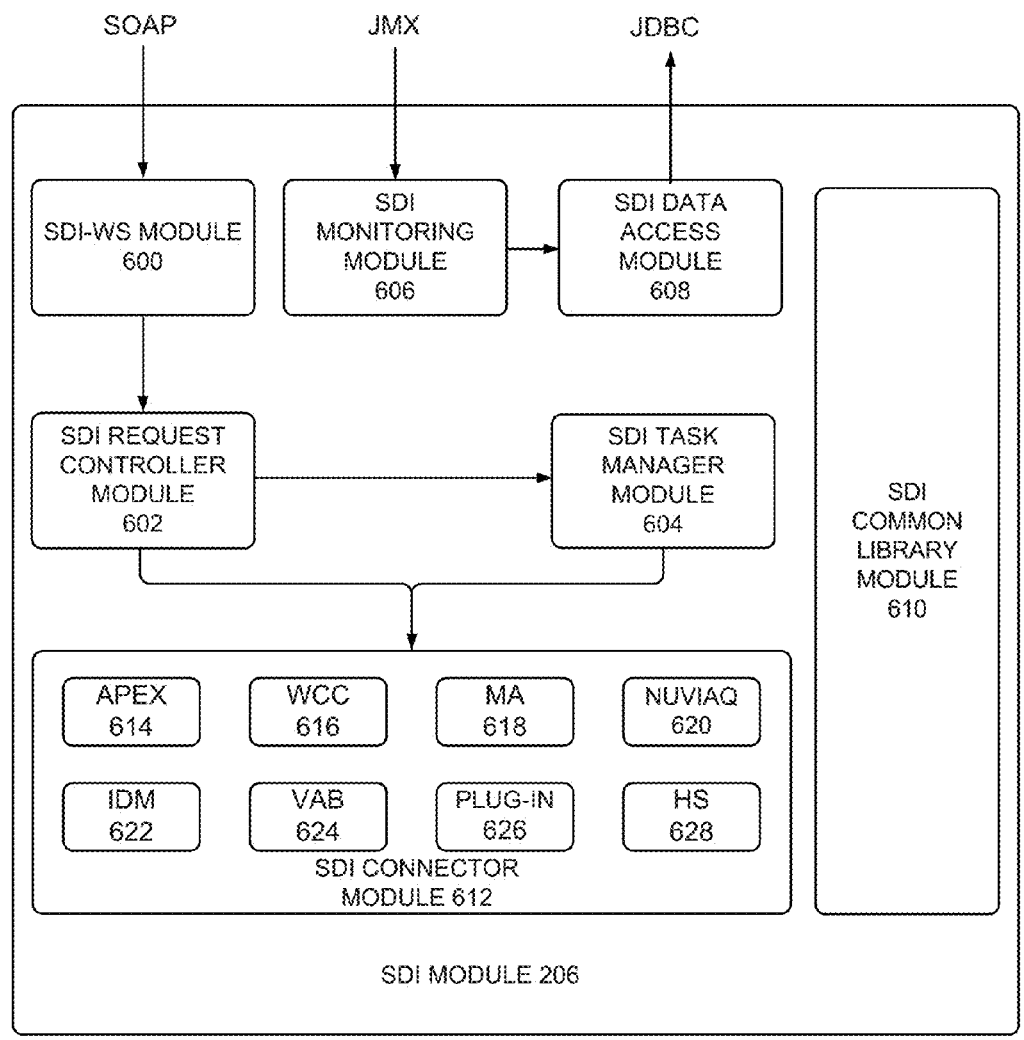
FIG. 6 depicts a simplified high level diagram of submodules of the SDI module according to an embodiment of the present invention.

FIG. 6 depicts a simplified high level diagram of sub-modules of the SDI module according to an embodiment of the present invention. In the embodiment depicted in FIG. 6, SDI module 206 includes a SDI-Web Services (WS) module 600, an SDI request controller module 602, an SDI task manager module 604, an SDI monitoring module 606, an SDI data access module 608, an SDI common library module 610, and an SDI connector module 612. These modules may be implemented in hardware, or software, or combinations thereof. SDI module 206 depicted in FIG. 6 and its various modules are meant for illustrative purposes only and are not intended to limit the scope of embodiments of the present invention. Alternative embodiments may have more or less modules than those shown in FIG. 6. These modules and their functions are described in detail below.

SDI-WS module 600 includes capabilities for receiving a step in the business associated with an order from business process executor 316 of TAS component 204. In one embodiment, SDI-WS module 600 parses each step of the business process and converts the step into an internal representation used by SDI module 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request processing engine in SDI module 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS module 204 with operation results that includes an order payload with details of the resources provisioned to fulfill the particular step. SDI task manager module 604 repeats this process until all the steps of the particular business process associated with the order are complete.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI module 206 provides an inbound interface for receiving Java Management Extensions (JMX) requests. SDI monitoring module 606 also provides tools for managing and monitoring applications, system objects and devices in cloud infrastructure system 100. SDI-data access module 608 provides an inbound interface for receiving Java Database Connectivity (JDBC) requests. SDI-data access module 608 supports data access and provides object relational mapping, java transaction API services, data access objects, and connection pooling in cloud infrastructure system 100. The SDI-common library module 610 provides configuration support for the modules in SDI module 206.

Figure 7A:
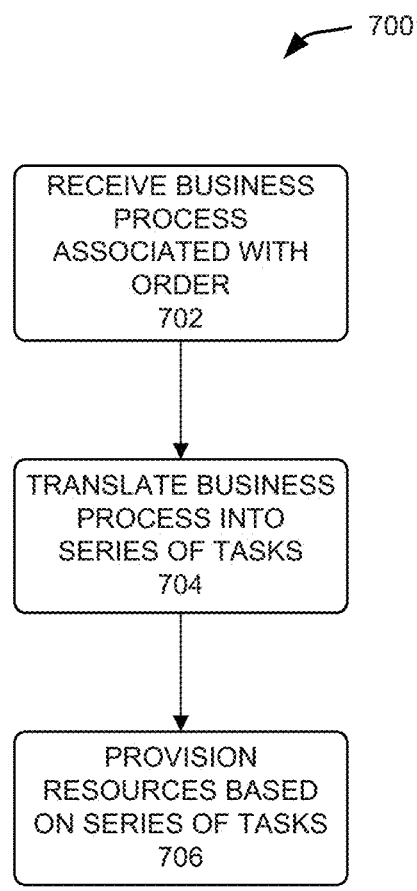
FIG. 7A depicts a simplified flowchart depicting processing that may be performed by the SDI component in the cloud infrastructure system, in accordance with an embodiment of the present invention.

The embodiment of FIG. 6 discussed above describes modules in the SDI module according to an embodiment of the present invention. FIG. 7A depicts a simplified flowchart 700 depicting processing that may be performed by the modules of the SDI module in the cloud infrastructure system, in accordance with an embodiment of the present invention. The processing depicted in FIG. 7A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7A is not intended to be limiting. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7A may be performed by one or more modules in the SDI module 206 discussed in detail in FIG. 6.

At 702, a business process associated with a subscription order is received. In one embodiment, SDI-WS module 600 in SDI module 206 receives one or more steps in the business process associated with the subscription order from business process executor 316. At 704, each step in the business process is translated into a series of tasks for provisioning resources for the subscription order. In one embodiment, SDI task manager module 604 in SDI module 206 translates each step specified in the business process into a series of tasks by utilizing the services of SDI connector module 612. At 706, the subscription order is provisioned based on the series of tasks. In one embodiment, and as discussed in FIG. 6, SDI connector module 612 includes one or more connectors for handling the deployment of tasks specified by SDI task manager module 604 to provision resources for the services in the subscription order.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 7B:
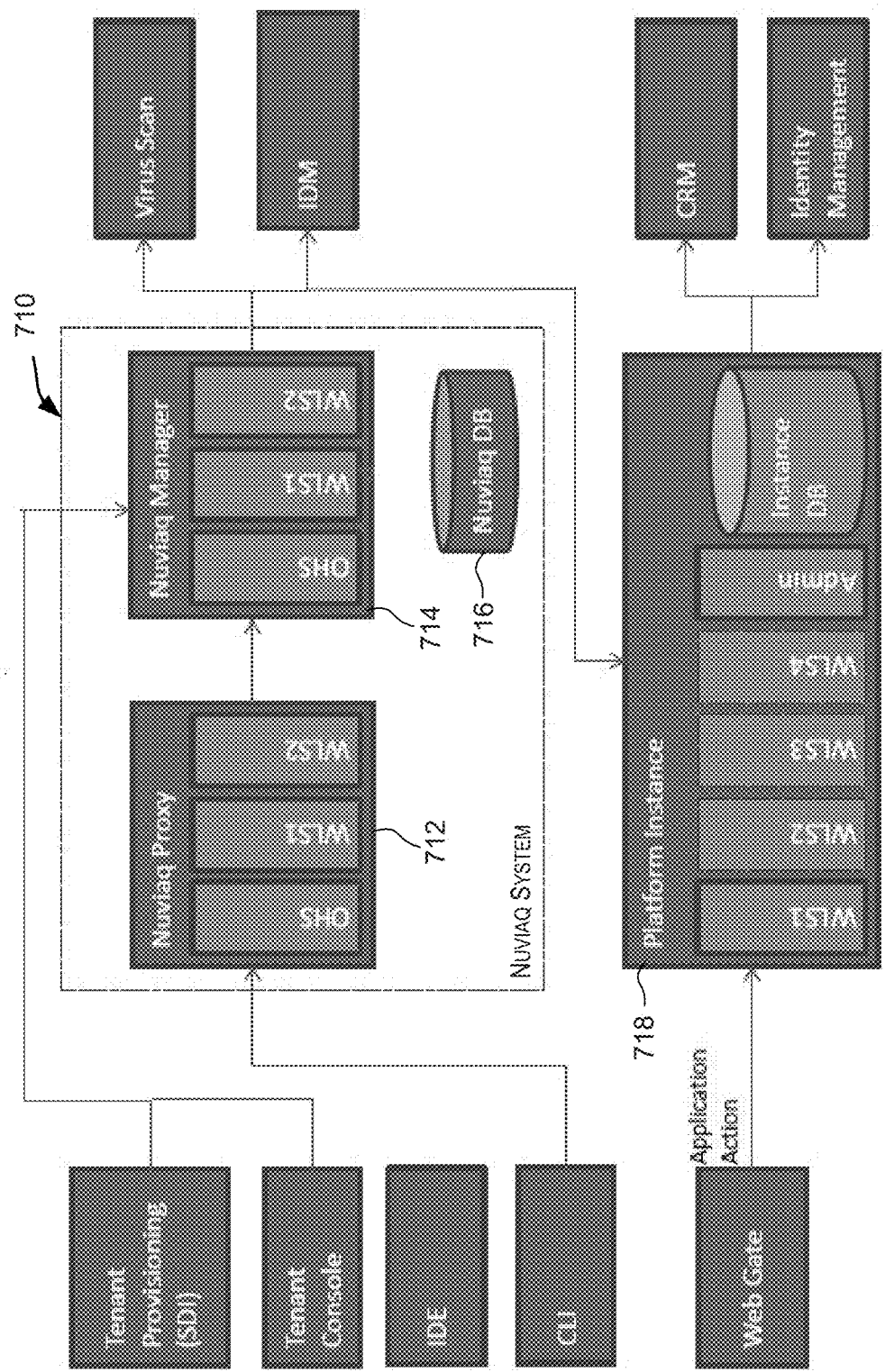
FIG. 7B depicts a simplified block diagram showing the high-level architecture of a Nuviaq system 710 and its relationships with other cloud infrastructure components according to an embodiment of the present invention.

FIG. 7B depicts a simplified block diagram showing the high-level architecture of a Nuviaq system 710 and its relationships with other cloud infrastructure components according to an embodiment of the present invention. It should be appreciated that Nuviaq system 710 depicted in FIG. 7B may have other components than those depicted in FIG. 7B. Further, the embodiment shown in FIG. 7B is only one example of a cloud infrastructure system that may incorporate an embodiment of the invention. In some other embodiments, Nuviaq system 710 may have more or fewer components than shown in FIG. 7B, may combine two or more components, or may have a different configuration or arrangement of components.

In certain embodiments, Nuviaq system 710 may be configured to provide a runtime engine for orchestrating PaaS operations. Nuviaq system 710 may provide a web service API to facilitate integration with other products and services. Nuviaq system 710 also provides support for complex workflows in system provisioning, application deployment and associated lifecycle operations and integrates with management and monitoring solutions.

In the embodiment depicted in FIG. 7B, Nuviaq system 710 comprises a Nuviaq proxy 712, a Nuviaq manager 714, and a Nuviaq database 716. In certain embodiments, Nuviaq manager 714 provides an entry point into Nuviaq system 710, providing secure access to PaaS operations via the web service API. Internally, it tracks system state in the database and controls job execution on the workflow engine. In a public cloud, Nuviaq manager 714 may be accessed by the Tenant Provisioning system (SDI 206) and the Tenant Console, to drive provisioning and deployment operations respectively.

In one embodiment, Nuviaq manager 714 executes jobs asynchronously via an internal workflow engine. A job may be a sequence of actions specific to a given PaaS workflow. Actions may be performed in order, with failure in any step resulting in failure of the overall job. Many workflow actions delegate to external systems relevant to the workflow, such as the EM command line interface (cli). In one implementation, Nuviaq manager 714 application may be hosted in a 2-node WebLogic cluster with associated HTTP server (e.g., Oracle HTTP Server or OHS) instance, running inside a firewall.

In certain embodiments, Nuviaq proxy 712 is the public access point to the Nuviaq API. In one embodiment, only Public API may be exposed here. Requests received by proxy 712 may be forwarded to Nuviaq manager 714. In one embodiment, Nuviaq proxy 712 runs outside the firewall, whereas manager 714 runs within the firewall. In one implementation, Nuviaq proxy 712 application runs on a WebLogic cluster running outside the firewall.

In certain embodiments, Nuviaq database 716 tracks various domain entities such as, without limitation, platform instance, deployment plan, application, WebLogic domain, jobs, alerts, and the like. Primary keys may be aligned with the Service Database where appropriate.

In one embodiment, Platform Instance 718 may contain all resources required for a WebLogic service for a given tenant.

Nuviaq system 710 may rely on additional systems of cloud infrastructure system 100 to carry out the workflows used the WebLogic cloud service. These dependencies may include dependencies on SDI 206, IDM 200, a virus scan system, a service database, CRM instances, and the like. For example, Nuviaq system 710 may depend upon functions performed by an Assembly Deployer in SDI 206. In one embodiment, the Assembly Deployer is a system to manage interactions with OVAB (Oracle Virtual Assembly Builder) and OVM (Oracle Virtual Machine). Capabilities of the Assembly Deployer used by Nuviaq system 710 may include, without limitation, functions for deploying an assembly, un-deploying an assembly, describing assembly deployment, scaling appliance, and the like. In one implementation, Nuviaq system 710 accesses the Assembly Deployer via a web service API.

In certain embodiments, security policies may require certain artifacts to be scanned for viruses before being deployed to an application. Cloud infrastructure system 100 may provide a virus scan system for this purpose that provides scanning as a service for multiple components of the public cloud.

In certain embodiments, a public cloud infrastructure may maintain a Service Database containing information about tenants (e.g., customers) and their service subscriptions. Nuviaq workflows may access to this data in order to properly configure a WebLogic service as a client to other services that the tenant also subscribes to.

Nuviaq system 710 may depend on IDM 200 for its security integration. In certain embodiments, Java Service instances can be associated with a CRM instance. The association allows user applications deployed to their Java Service instance to access a CRM instance though Web Service calls.

Various entities may use services provided by Nuviaq system 710. These clients of Nuviaq system 710 may include: a Tenant Console, which is an management server (e.g., Oracle Management Server) based user interface that customers may access to manage their applications on their platform instances; several IDEs such as Oracle IDEs (JDeveloper, NetBeans, and OEPE) have been extended to offer access to application lifecycle management operations; one or more Command Line Interfaces (CLIs) that are available to access lifecycle operations on the platform instances.

Provisioning use case for Nuviaq system 710—A Provision Platform Instance use case is realized via the Create Platform Instance operation of the Nuviaq API. In the context of cloud infrastructure system 100, a service instance with respect to the Nuviaq system corresponds to a Nuviaq platform instance. A platform instance is assigned a unique identifier is used on all subsequent operations related to this instance. A Platform Deployment descriptor provided to the Create Platform Instance action allows for properties to be set that modify the configuration of the platform instance to meet the subscription requirements of the tenant. These properties may include for example:

Property#1: oracle.cloud.service.weblogic.size
  Values: BASIC, STANDARD, ENTERPRISE
  Description: Specifies the subscription type. This impacts the number of servers, database limits and quality of service settings.
Property#2: oracle.cloud.service.weblogic.trial
  Values: TRUE, FALSE
  Description: Indicates whether or not this is a trial subscription.
Property#3: oracle.cloud.service.weblogic.crm
  Values: CRM Service ID
  Description: Identifies a CRM service to be associated with this WebLogic service instance.

Figure 7C:
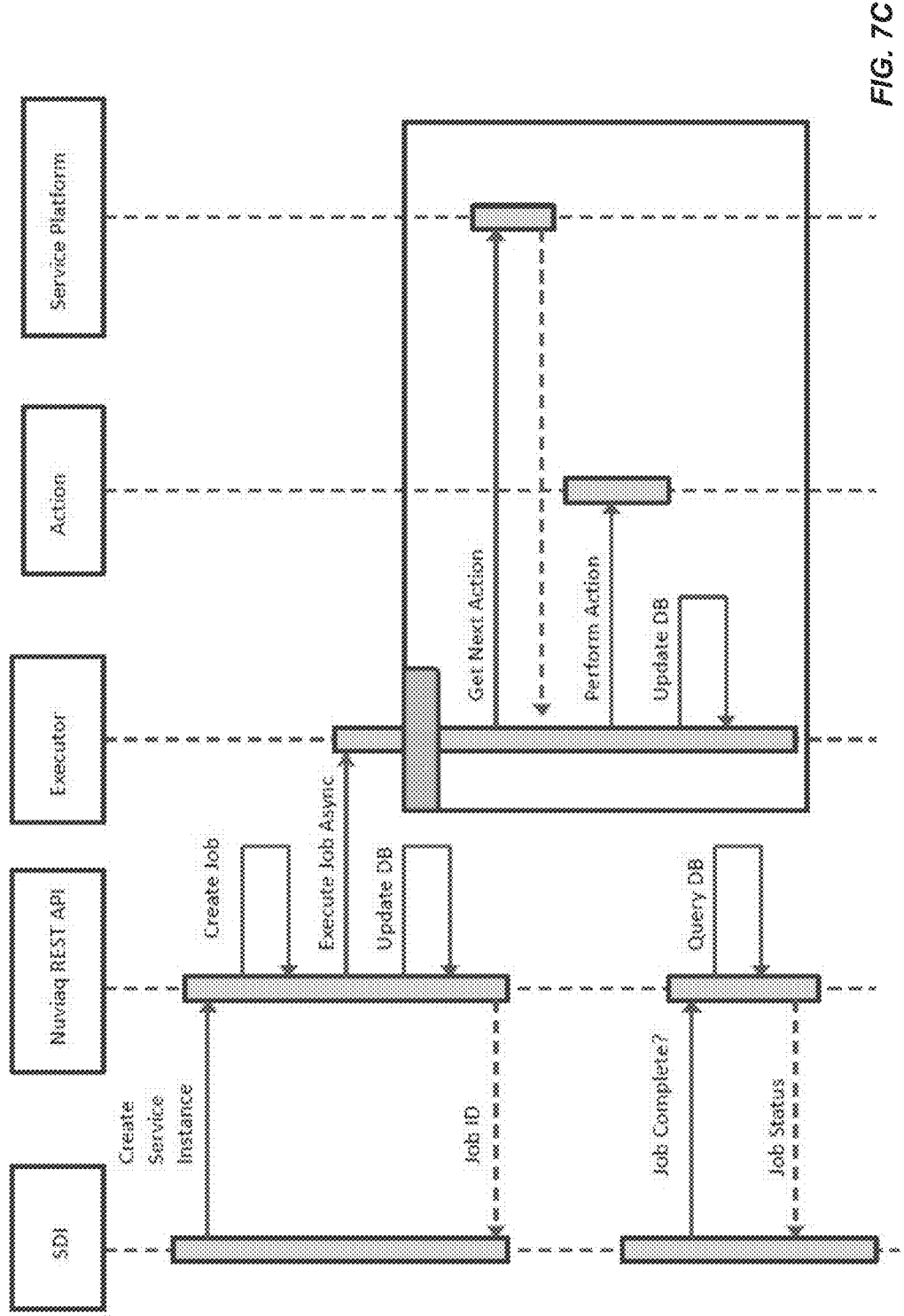
FIG. 7C depicts an example sequence diagram illustrating steps of a provisioning process using a Nuviaq system according to an embodiment of the present invention.

FIG. 7C depicts an example sequence diagram illustrating steps of a provisioning process using a Nuviaq system according to an embodiment of the present invention. The sequence diagram depicted in FIG. 7C is only an example and is not intended to be limiting.

Install/Update Application use case—The Install Application operation deploys an application to a running WebLogic Server after validating that the application archive meets the security requirements of the Public Cloud. In one embodiment, the Application Deployment descriptor provided to the Install Application action allows for properties to be set that modify the configuration of the application to meet the subscription requirements of the tenant. These properties may include for example:

Property: oracle.cloud.service.weblogic.state
Values: RUNNING, STOPPED
Description: Specifies the initial state of the application after deployment.

Figure 7D:
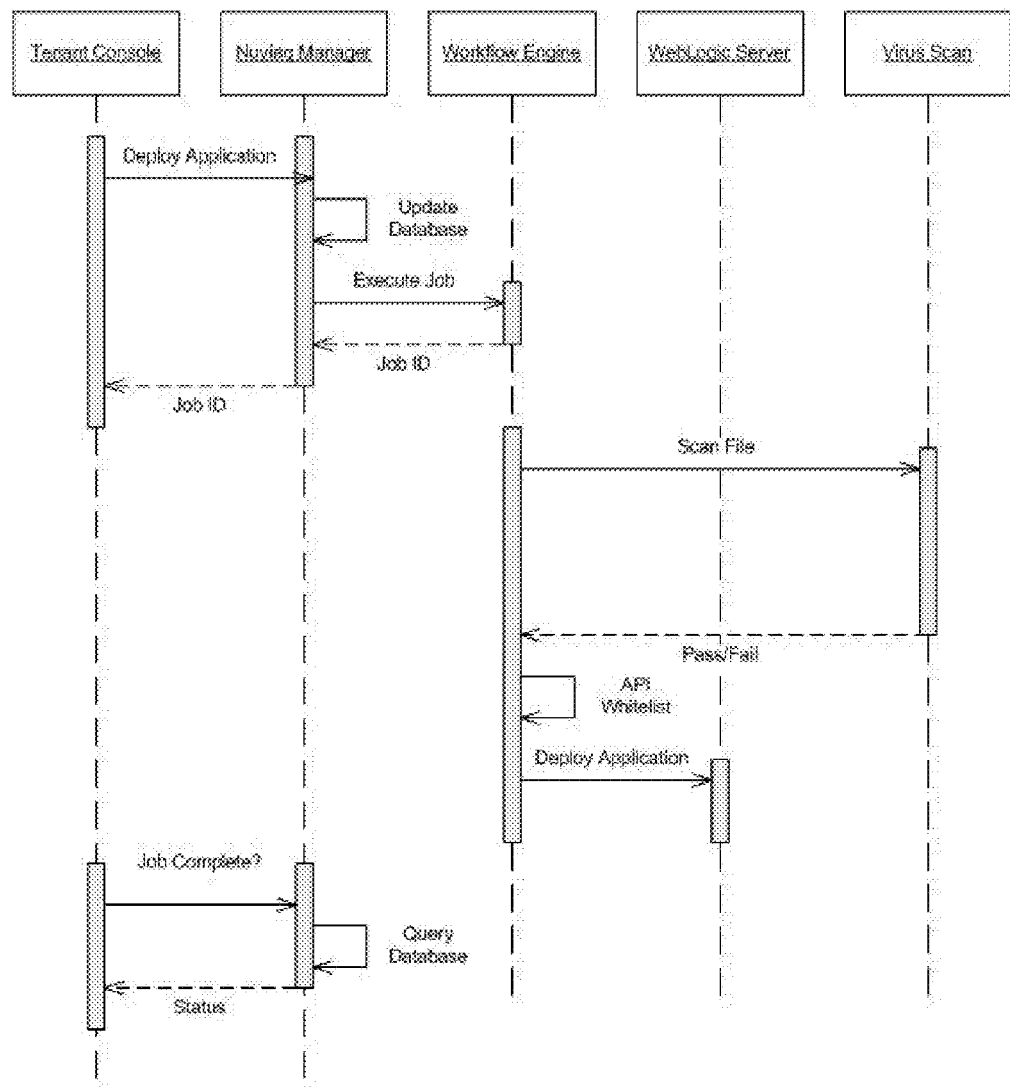
FIG. 7D depicts an example sequence diagram illustrating steps of a deployment process using a Nuviaq system according to an embodiment of the present invention.

FIG. 7D depicts an example sequence diagram illustrating steps of a deployment process using a Nuviaq system according to an embodiment of the present invention. The sequence diagram depicted in FIG. 7D is only an example and is not intended to be limiting.

Referring back to FIG. 2, in certain embodiments, TAS 204 and SDI 206 working in cooperation are responsible for provisioning resources for one or more services ordered by a customer from a set of services offered by cloud infrastructure system 100. For example, in one embodiment, for provisioning a database service, the automated provisioning flow may be as follows for a paid subscription:

(1) Customer places an order for a paid subscription to a service via Store UI 210.
(2) TAS 204 receives the subscription order.
(3) When services are available TAS 204 initiates provisioning by using the services of SDI 206. TAS 204 may perform business process orchestration, which will execute the relevant business process to complete the provisioning aspect of the order. In one embodiment, TAS 204 may use a BPEL (Business Process Execution Language) Process Manager to orchestrate the steps involved in the provisioning and handle the lifecycle operations.
(4) In one embodiment, to provision a database service, SDI 206 may call PLSQL APIs in the CLOUD_UI to associate a schema for the requesting customer.
(5) After successful association of a schema to the customer, SDI signals TAS and TAS send a notification to the customer that the database service is now available for use by the customer.
(6) The customer may log into cloud infrastructure system 100 (e.g., using an URAL such as cloud.oracle.com) and activate the service.

In some embodiments, a customer may also be allowed to subscribe to a service on a trial basis. For example, such a trial order may be received via cloud UI 212 (e.g., using cloud.oracle.com).

Figure 7E:
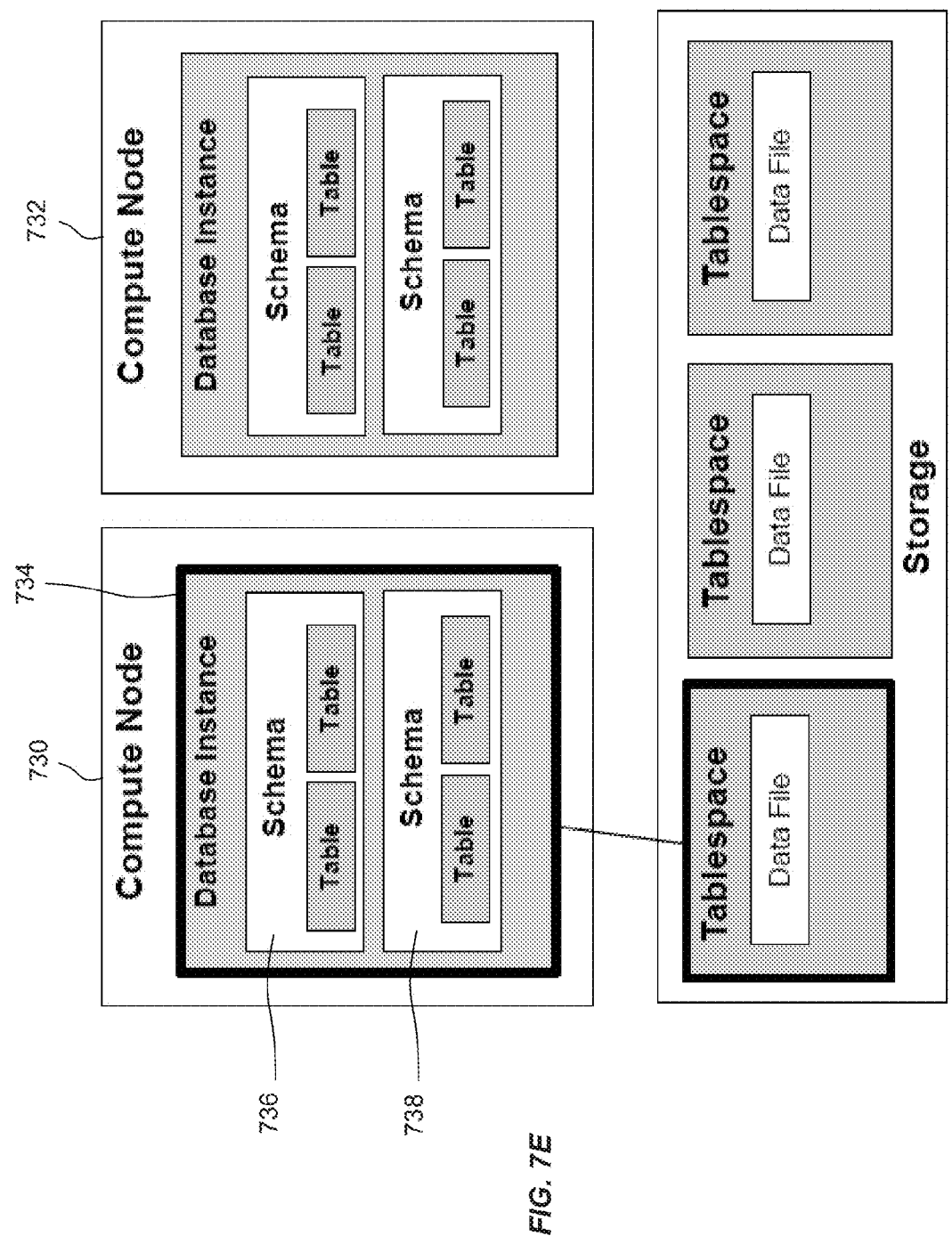
FIG. 7E depicts an example of database instances provisioned for a database service according to an embodiment of the present invention.

In certain embodiments, cloud infrastructure system 100 enables underlying hardware and service instances to be shared between customers or tenants. For example, the database service may be provisioned as shown in FIG. 7E in one embodiment. FIG. 7E depicts multiple Exadata compute nodes 730 and 732, each providing a database instance provisioned for the database service. For example, compute node 730 provides a database instance 734 for a database service. Each Exadata compute node may have multiple database instances.

In certain embodiments, each database instance can comprise multiple schemas and the schemas may be associated with different customers or tenants. For example, in FIG. 7E, database instance 734 provides two schemas 736 and 738, each with its own tables. Schema 736 may be associated with a first customer or tenant subscribing to a database service and schema 738 may be associated with a second customer or tenant subscribing to the database service. Each tenant gets a completely isolated schema. Each schema acts like a container that can manage database objects including tables, views, stored procedures, triggers, etc. for the associated tenant. Each schema may have one dedicated tablespace, with each tablespace having one data file.

In this manner, a single database instance can provide database services to multiple tenants. This not only enables sharing of underlying hardware resources but also enables sharing of service instance between tenants.

In certain embodiments, such a multi-tenancy system is facilitated by IDM 200, which beneficially enables multiple separate customers, each having their own separate identity domains, to use hardware and software that is shared in the cloud. Consequently, there is no need for each customer to have its own dedicated hardware or software resources, and in some cases resources that are not being used by some customers at a particular moment can be used by other customers, thereby preventing those resources from being wasted. For example, as depicted in FIG. 7E, a database instance can service multiple customers each with their respective identity domains. Although each such database service instance can be a separate abstraction or view of a single physical multi-tenant database system that is shared among the many separate identity domains, each such database service instance can have a separate and potentially different schema than each other database service instance has. Thus, the multi-tenant database system can store mappings between customer-specified database schemas and the identity domains to which those database schemas pertain.

The multi-tenant database system can cause the database service instance for a particular identity domain to use the schema that is mapped to that particular identity domain.

The multi-tenancy can also be extended to other services such as the Java Service. For example, multiple customers can have a JAVA service instance placed within their respective identity domains. Each such identity domain can have a JAVA virtual machine, which can be viewed as being a virtual "slice" of hardware. In one embodiment, a job-monitoring service (e.g., Hudson) can be combined with a JAVA enterprise edition platform (e.g., Oracle WebLogic) in the cloud to enable each separate identity domain to have its own separate virtual "slice" of the JAVA enterprise edition platform. Such a job-monitoring service can, for example, monitor the execution of repeated jobs, such as building a software project or jobs run by an operating system's time-based job scheduler. Such repeated jobs can include the continuous building and/or testing of software projects. Additionally or alternatively, such repeated jobs can include the monitoring of executions of operating system-run jobs that are executed on machines that are remote from the machine on which the job-monitoring service executes.

In certain embodiments, as part of processing a subscription order, cloud infrastructure system 100 may need to synchronize the data stored by components in cloud infrastructure system 100 to ensure the consistency of information stored by these components. As an example, a component in order processing module 310 may process subscription information related to a subscription order which may in turn be utilized by a component in TAS module 204 to orchestrate the provisioning of services and resources for the order placed by the customer. As another example, usage data related to the subscription order such as the amount of storage used, the amount data transferred, the number of users deployed for services in the subscription order may be generated in TAS data centers, 402, 404 and 406 and consumed by the TAS central component. In certain embodiments, cloud infrastructure system 100 defines a synchronization infrastructure that synchronizes data stored between the components in the cloud infrastructure system.

Figure 8A:
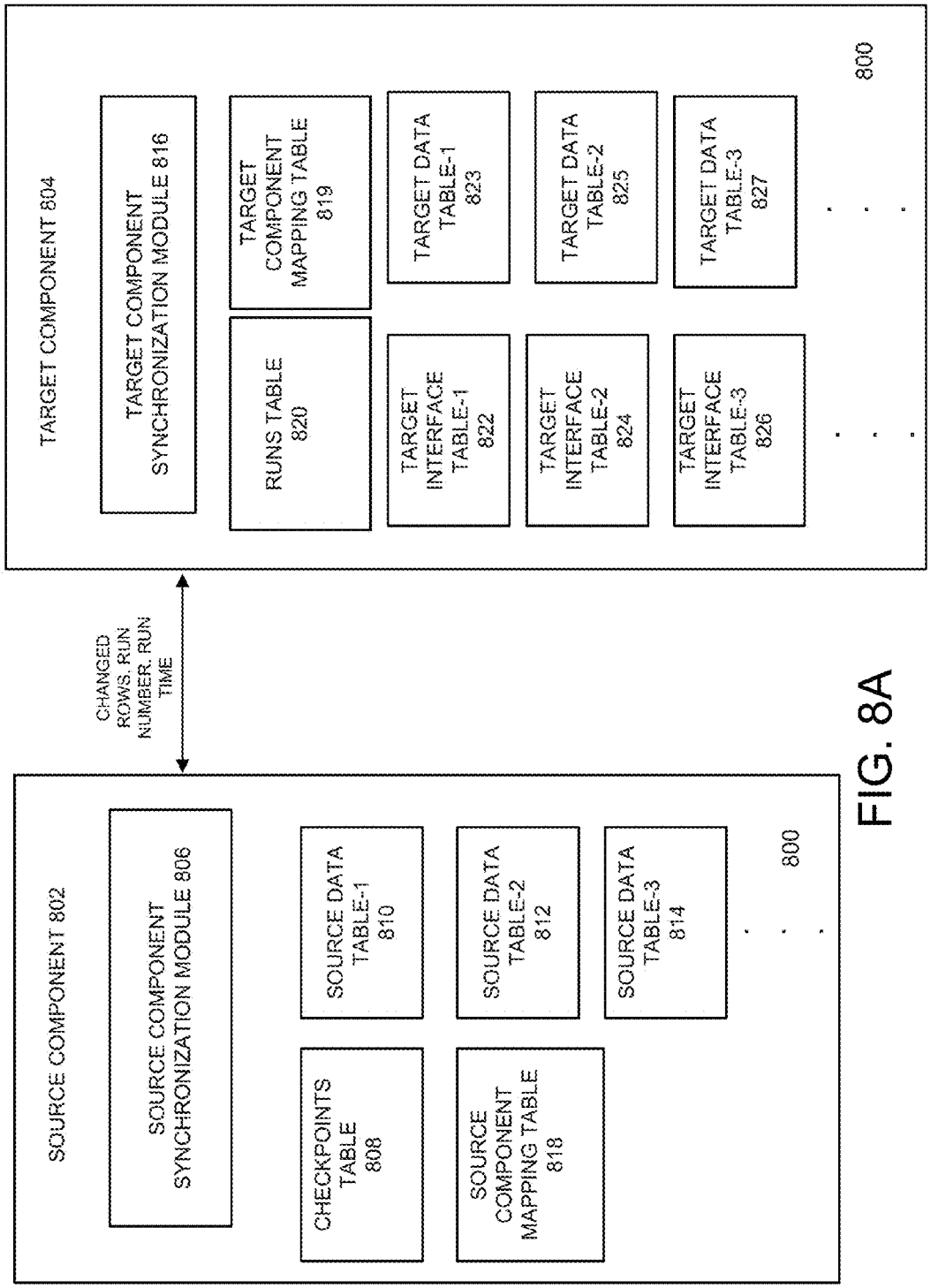
FIG. 8A illustrates a synchronization infrastructure that is used to perform data synchronization between two components in cloud infrastructure system according to an embodiment of the present invention.

FIG. 8A illustrates a synchronization infrastructure that is used to perform data synchronization between two components in cloud infrastructure system 100 according to an embodiment of the present invention. The example illustrated in FIG. 8A shows a source component 802 and a target component 804 in cloud infrastructure system 100. Synchronization infrastructure 800 in source component 802 includes a source component synchronization module 806 that synchronizes information stored in the source component by utilizing information stored in checkpoints table 808, one or more source data tables, 810, 812 and 814 and source component mapping table 818. Synchronization infrastructure 800 in target component 804 includes a target component synchronization module 816 that utilizes information stored in target component mapping table 819, runs table 820, one or more target interface tables, 822, 824 and 826 and one or more target data tables 823, 825 and 827 to synchronize data between source component 802 and target component 804.

In one embodiment, source data tables 810, 812 and 814, target interface tables 822, 824 and 826 and target data tables 823, 825 and 827 store subscription information related to an order request in source component 802 and target component 804. The subscription information may include usage data related to the subscription order such as the amount of storage used, the amount of data transferred, the number of users deployed for services in the order and so on. Although the example shown in FIG. 8A illustrates three source data tables, source data table-1 810, source data table-2 812 and source data table-3 814, three target interface tables, target interface table-1 822, target interface table-2 824 and target interface table-3 826 and three target data tables, target data table-1 823, target data table-2 825 and target data table-3 827, it is to be appreciated that additional information may be stored in additional data tables in source component 802 and target component 804, in other embodiments.

FIG. 8B illustrates exemplary information stored in the various tables in the source component and the target component to achieve data synchronization, according to one embodiment of the present invention. In the example shown in FIG. 8B, in one embodiment, checkpoints table 808 in source component 802 includes columns identifying for each of the source data tables, a "data table name", identifying the data table, a "checkpoint number" which is an identifier that identifies a state of the data in the data table at a particular checkpoint time, a "run time" which is the time at which the last data synchronization operation was executed for this table, and a "run number" which is an identifier that identifies a distinct run number for each data synchronization run of the data table. In one embodiment the checkpoint number is a transactionally consistent system change number associated with each row in checkpoints table 808. Using system change number instead of just last modification time ensures that a transactionally consistent snapshot of the data from the source component is pushed to the target component. In other words, data modified by not-yet-committed transactions is not missed as these rows are tagged with higher system change numbers when these transactions commit and hence are pushed in the next run of the synchronization operation at the source component.

Exemplary information stored in a source data table, such as data table-1 810 in source component 802 includes a column identifying a row number in the data table, one or more checkpoint numbers which identify different states of the data stored in the data table, a "last modification time" which identifies the time at which the data in a particular row of the data table was updated and "component specific information" such as the state of the subscription order being processed at the "last modification time". As discussed above, one or more states of the order may include an initialized state, an active state, a ready to be provisioned state, a completed state and so on.

Source component mapping table 818 stores information that maps a data table in source component 802 to a corresponding interface data table in target component 804. Target component mapping table 819 stores information that maps an interface table in target component 904 to a corresponding target table in the target component. In certain embodiments, a data synchronization job in source component 802 uses mapping table 818 to determine a corresponding target component interface table (e.g., 822, 824 or 826) to which the data from a source component data table (e.g., 810, 812 or 814) needs to be pushed. A background job in target component 804 picks up the data from the interface tables 822, 824 or 826 and then pushes them to their corresponding target component data tables (e.g., 823, 825 or 827). Having target component interface tables between the source component data tables and the target component data tables allows target component 804 to execute any target component specific transformations before the data is stored in appropriate target component data tables. In other embodiments, other mapping tables may be included in target component 804 that store a mapping between the target component interface tables to their corresponding target component data tables to allow other types of transformations when data is moved from the interface tables to the target data tables.

Runs table 832 includes columns identifying for each of the target interface tables, an "interface table name", identifying the interface table, the "run time" which is the last time at which the run number for a data synchronization run for the interface table was updated and the "run number" that identifies a distinct run number for the data synchronization run of the interface table. Target interface table-1 834 includes columns identifying a row number in the target interface table, the "run number" that identifies a distinct run number for a data synchronization run for the interface table and the "run time" which is the time at which the last data synchronization operation was executed on this interface table. In addition, target interface table-1 834 includes a column that identifies "component specific information" such as the state of the subscription order being processed at the "run time." As discussed above, one or more states of the order may include an initialized state, an active state, a ready to be provisioned state, a completed state and so on.

In certain embodiments, source component synchronization module 806 performs the synchronization of data between source component 802 and target component 804 for each of the source data tables 810, 812 and 814. For purposes of this document, the synchronization of data between source component 802 and target component 804 for a particular source data table-1 810 and a particular target interface table-1 822 is described. Source component synchronization module 806 invokes a background job that periodically determines if the checkpoint information such as the checkpoint numbers of one or more rows in source data table-1 810 have changed since the last "run time" as per the information stored in checkpoints table 808. This is done by comparing the checkpoint numbers of each row in source data table-1 810 with the checkpoint number stored in checkpoints table 808 for this source data table.

If the checkpoint numbers of one or more rows have changed, then synchronization module 806 identifies the rows in source data table-1 810 that have checkpoint numbers that are greater than the checkpoint number stored in checkpoints table 808. For example, as per the information in checkpoints table 808 and source data table-1 810, source component synchronization module 806 identifies that rows 3, 4 and 5 of source data table-1 810 have checkpoint numbers, 8900001, 8900007 and 8900009 that are greater than the checkpoint number, 8900000 stored in checkpoints table 808.

If more than one row is identified as having a checkpoint number that is greater than the checkpoint number stored in checkpoints table 808, source component synchronization module 806 identifies the row in source data table-1 810 that has the maximum checkpoint number and updates checkpoints table 808 with the this maximum checkpoint number. As per the information in data table-1 810, this row is identified as row 5, since it has a checkpoint number of 8900009. In addition, source component synchronization module 806 updates checkpoints table 808 with a new run time (this is the current time when this run of the data synchronization job executes) and a new run number. In one embodiment, the new run number is computed by incrementing the run number for source data table-1810 in checkpoints table 808 by 1. If the current time when the data synchronization job runs is 11 Feb. 2013, 5:01:00 EST, the new run time is determined to be 11 Feb. 2013, 5:01:00 EST and the new run number is determined to be 2+1=3. An updated checkpoints table 836 as a result of data synchronization at source component 802 is shown in FIG. 8C.

Source component synchronization module 806 then transfers information related to the changed rows to the target interface table-1 822. As part of transferring the information, source component synchronization module 806 transfers the new run number and the new run time for each of the changed rows. Target component synchronization module 816 then updates target interface table-1 822 with the rows received from source component synchronization module 806. An updated target interface table-1 838 as a result of data synchronization at target component 804 is shown in FIG. 8C.

A background job in target component 804 periodically scans the target interface tables 822, 824 and 826 to find rows with a run number greater than the run number for the interface table (i.e., 822) recorded in runs table 820. If any such row is found, the background job executes the following steps:

It updates the run number and run time in the runs table 820 for this interface table (i.e., 820) with the run number and run time of the row in the interface table that has the maximum run number among the rows found above. An updated runs table 840 is illustrated in FIG. 8C.

It applies target component specific transformations (if any) on the rows of the interface table (i.e., 822) and applies the result to the corresponding target data table recorded in target component mapping table 819.

FIG. 9A depicts a simplified flowchart 900 depicting processing that may be performed by source component 802 to achieve data synchronization, in accordance with an embodiment of the present invention. The processing depicted in FIG. 9 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 9 is not intended to be limiting. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 9 may be performed by one or more components in the security infrastructure 900 discussed in detail in FIG. 9.

At 902, a first computing device (for example, source component 802) stores a subscription order related to one or more services subscribed to by a customer. In one embodiment, subscription order information related to the subscription order may be stored in order database 224 and source component 802 may receive this information from order database 224.

At 904, the first computing device identifies one or more rows in a first data table (for example, source data table-1 810) having checkpoint numbers that are greater than a first checkpoint number. In one embodiment, and as per the example discussed in FIGS. 8A, 8B and 8C, the rows are identified by comparing the checkpoint numbers of each row in source data table-1 810 with the checkpoint number stored in checkpoints table 808.

At 906, the first computing device identifies one of the rows in the first data table that has the maximum checkpoint number.

At 908, the first computing device stores the maximum checkpoint number. As per the example discussed in FIGS. 8A, 8B and 8C, the checkpoint number stored in checkpoints table 808 is updated with the maximum checkpoint number (as shown in updated checkpoints table 836). In addition, checkpoints table is updated with a new run time (as per the time when the data synchronization operation is executed) and a new run number.

At 910, the computing device transfers the one or more identified rows to a computing device (for example, target component synchronization module 816) in a second computing device (for example, target component 804) in cloud infrastructure system 100. As part of transferring the information, the computing device (source component synchronization module 806) transfers the new run number and the new run time for each of the identified rows to the second computing device.

FIG. 9B depicts a simplified flowchart 912 depicting processing that may be performed by the target component to achieve data synchronization, in accordance with an embodiment of the present invention.

At 914, a second computing device (for example, target component 804) receives the identified rows from source component 802. In addition to receiving the identified rows, in one embodiment, the second computing device also receives a new run number and a new run time related to the identified rows.

At 916, the second computing device updates a second interface table (for example, updated target interface table-1 838) with the identified rows, the new run number and the new run time.

At 918, a background job in the second computing device scans the interface tables 822, 824 and 826 to find rows with a run number greater than the run number for the interface table (i.e., 822) recorded in the runs table.

At 920, if any such row is found, the background job updates the run number and run time in the runs table for this interface table (i.e., 822) with the run number and run time of the row in the interface table that has the maximum run number among the rows found above. Additionally, the background job applies target component specific transformations (if any) on these interface table rows and applies the result to the corresponding target data table recorded in target component mapping table 819.

Figure 10:
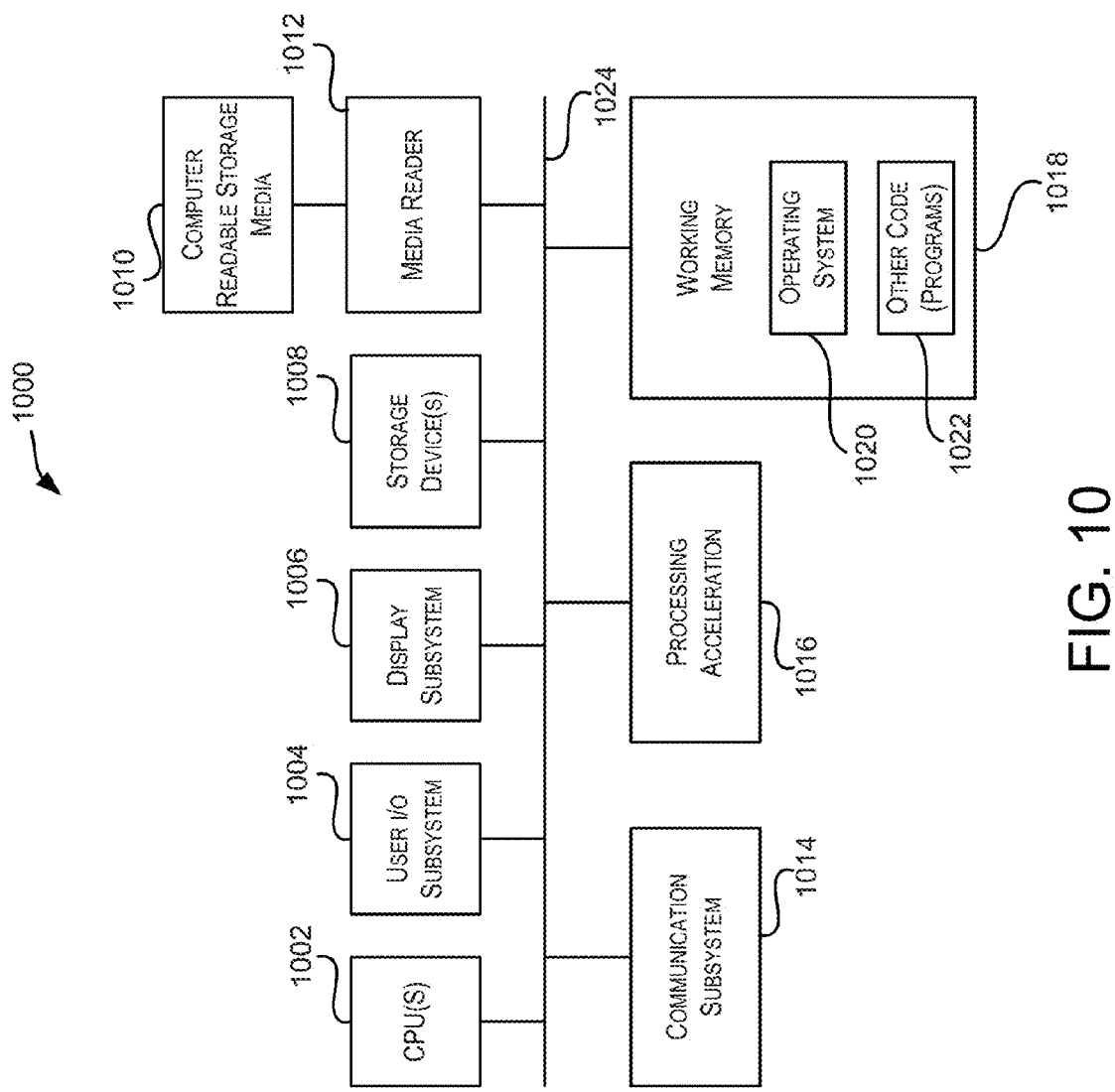
FIG. 10 is a simplified block diagram of a computing system that may be used in accordance with embodiments of the present invention.

FIG. 10 is a simplified block diagram of a computing system 1000 that may be used in accordance with embodiments of the present invention. For example, cloud infrastructure system 100 may comprise one or more computing devices. System 1000 depicted in FIG. 10 may be an example of one such computing device. Computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). The CPUs may include single or multicore CPUs. Computer system 1000 may also include one or more storage devices 1008. By way of example, the storage device(s) 1008 may include devices such as disk drives, optical storage devices, and solid-state storage devices such as a random access memory (RAM) and/or a read-only memory (ROM), which can be programmable, flash-updateable and/or the like.

Computer system 1000 may additionally include a computer-readable storage media reader 1012, a communications subsystem 1014 (e.g., a modem, a network card (wireless or wired), an infra-red communication device, etc.), and working memory 1018, which may include RAM and ROM devices as described above. In some embodiments, computer system 1900 may also include a processing acceleration unit 1016, which can include a digital signal processor (DSP), a special-purpose processor, and/or the like.

Computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing computer-readable information. Communications system 1014 may permit data to be exchanged with network 1024 and/or any other computer described above with respect to system environment 1000.

Computer system 1000 may also comprise software elements, shown as being currently located within working memory 1018, including an operating system 1020 and/or other code 1022, such as an application program (which may be a client application, Web browser, mid-tier application, RDBMS, etc.). In an exemplary embodiment, working memory 1018 may include executable code and associated data structures such as memory structures used for processing authorization requests described above. It should be appreciated that alternative embodiments of computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data. Examples of storage and computer-readable media include RAM, ROM, EEPROM, flash memory or other memory technology, CD-ROM, digital versatile disk (DVD) or other optical storage, magnetic cassettes, magnetic tape, magnetic disk storage or other magnetic storage devices, or any other memory medium which can be used to store the desired information and which can be read by a computer. Storage media and computer readable media may include non-transitory memory devices.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-implemented method comprising:
   for a source table in a first computing device comprised in a computing infrastructure system, the source table comprising a plurality of rows, each row of the plurality of rows associated with a checkpoint number, determining, based upon a first checkpoint number associated with the source table and checkpoint numbers associated with the plurality of rows in the source table, a set of one or more rows of the source table that have changed since when the source table was last synchronized with a corresponding target table;
   determining a first run number associated with the source table, the first run number indicative of a number of data synchronization runs performed for the source table;
   determining a second run number for the source table based at least in part on determining that the set of one or more rows of the source table have changed;
   associating, by the first device, the second run number with the source table instead of the first run number; and
   transferring, by the first device, the set of one or more rows to a target table in a second computing device and associating each row of the set of one or more rows in the target table with the second run number.

2. The method of claim 1, wherein determining the set of one or more rows that have changed comprises identifying the checkpoint numbers associated with the plurality of rows in the source table that are greater than the first checkpoint number.

3. The method of claim 2, further comprising determining a second checkpoint number, wherein determining the second checkpoint number comprises identifying a row in the set of one or more rows with a highest checkpoint number.

4. The method of claim 3, further comprising associating the second checkpoint number with the source table instead of the first checkpoint number.

5. The method of claim 3, wherein determining the second run number for the source table is further based on identifying the row in the set of one or more rows with the highest checkpoint number.

6. The method of claim 1, wherein transferring the set of one or more rows to the target table further comprises transferring a new run time associated with each row of the set of one or more rows to the target table.

7. The method of claim 6, further causing by the first computing device to store the second run number and the new run time in a runs table associated with the target table.

8. A system comprising:
   one or more computing devices configurable to provide one or more services;
   a memory configurable to store a subscription order related to the one or more services provided by the system; and
   wherein a first computing device from the one or more computing devices is configurable to:
     identify a source table in the first computing device, the source table comprising a plurality of rows, each row of the plurality of rows associated with a checkpoint number;
     determine based upon a first checkpoint number associated with the source table and checkpoint numbers associated with the plurality of rows in the source table, a set of one or more rows of the source table that have changed since when the source table was last synchronized with a corresponding target table;
     determine a first run number associated with the source table, the first run number indicative of a number of data synchronization runs performed for the source table;
     determine a second run number for the source table based at least in part on determining that the set of one or more rows of the source table have changed;
     associate the second run number with the source table instead of the first run number; and
     transfer the set of one or more rows to a target table in a second computing device and associate each row of the set of one or more rows in the target table with the second run number.

9. The system of claim 8, wherein the first computing device is further configured to determine the set of one or more rows that have changed by identifying the checkpoint numbers associated with the plurality of rows in the source table that are greater than the first checkpoint number.

10. The system of claim 9, wherein the first computing device is further configured to determine a second checkpoint number, wherein the second checkpoint number is determined based on identifying a row in the set of one or more rows with a highest checkpoint number.

11. The system of claim 10, wherein the first computing device is further configured to associate the second checkpoint number with the source table instead of the first checkpoint number.

12. The system of claim 10, wherein the first computing device is further configured to determine the second run number for the source table based on identifying the row in the set of one or more rows with the highest checkpoint number.

13. The system of claim 8, wherein the first computing device is further configured to transfer a new run time associated with each row of the set of one or more rows to the target table.

14. The system of claim 13, wherein the first computing device is further configured to store the second run number and the new run time in a runs table associated with the target table.

15. A non-transitory computer-readable memory storing a plurality of instructions executable by one or more processors, the plurality of instructions comprising:
   instructions that cause at least one processor from the one or more processors to identify a source table in a first computing device, the source table comprising a plurality of rows, each row of the plurality of rows associated with a checkpoint number;
   instructions that cause at least one processor from the one or more processors to determine based upon a first checkpoint number associated with the source table and checkpoint numbers associated with the plurality of rows in the source table, a set of one or more rows of the source table that have changed since when the source table was last synchronized with a corresponding target table;

instructions that cause at least one processor from the one or more processors to determine a first run number associated with the source table, the first run number indicative of a number of data synchronization runs performed for the source table;

instructions that cause at least one processor from the one or more processors to determine a second run number for the source table based at least in part on determining that the set of one or more rows of the source table have changed;

instructions that cause at least one processor from the one or more processors to associate the second run number with the source table instead of the first run number; and instructions that cause at least one processor from the one or more processors to transfer the set of one or more rows to a target table in a second computing device and associate each row of the set of one or more rows in the target table with the second run number.

16. The non-transitory computer-readable memory of claim 15, further comprising instructions that cause at least one processor from the one or more processors to determine the set of one or more rows that have changed by identifying the checkpoint numbers associated with the plurality of rows in the source table that are greater than the first checkpoint number.

17. The non-transitory computer-readable memory of claim 16, further comprising instructions that cause at least one processor from the one or more processors to determine a second checkpoint number by identifying a row in the set of one or more rows with a highest checkpoint number.

18. The non-transitory computer-readable memory of claim 17, wherein the instructions cause at least one processor from the one or more processors to associate the second checkpoint number with the source table instead of the first checkpoint number.

19. The non-transitory computer-readable memory of claim 17, wherein the instructions further cause at least one processor from the one or more processors to determine the second run number for the source table based on identifying the row in the set of one or more rows with the highest checkpoint number.

20. The non-transitory computer-readable memory of claim 15, wherein the instructions further cause at least one processor from the one or more processors to transfer the set of one or more rows to the target table further comprise instructions to cause at least one processor from the one or more processors to transfer a new run time associated with each row of the set of one or more rows to the target table.

* * * * *

UNITED STATES PATENT AND TRADEMARK OFFICE
CERTIFICATE OF CORRECTION

PATENT NO.        : 9,734,224 B2
APPLICATION NO.   : 14/664528
DATED             : August 15, 2017
INVENTOR(S)       : Chatterjee et al.

Page 1 of 1

It is certified that error appears in the above-identified patent and that said Letters Patent is hereby corrected as shown below:

On page 4, Column 1, under Other Publications, Line 17, delete "Idapsearch" and insert -- ldapsearch --, therefor.

On page 4, Column 1, under Other Publications, Line 25, delete "Realibily" and insert -- Reliability --, therefor.

On page 5, Column 1, under Other Publications, Line 26, delete "undejps.htm" and insert -- underjps.htm --, therefor.

On page 5, Column 2, under Other Publications, Line 33, delete "Catacylsm" and insert -- Cataclysm --, therefor.

Signed and Sealed this
Twenty-ninth Day of May, 2018

Andrei Iancu
*Director of the United States Patent and Trademark Office*